United States Patent
Kharzeev et al.

(10) Patent No.: US 10,657,456 B1
(45) Date of Patent: May 19, 2020

(54) QUANTUM COMPUTING USING CHIRAL QUBITS

(71) Applicants: THE RESEARCH FOUNDATION FOR THE STATE UNIVERSITY OF NEW YORK, Albany, NY (US); BROOKHAVEN SCIENCE ASSOCIATES, LLC, Upton, NY (US)

(72) Inventors: Dmitri Kharzeev, Port Jefferson, NY (US); Qiang Li, Upton, NY (US)

(73) Assignees: BROOKHAVEN SCIENCE ASSOCIATES, LLC, Upton, NY (US); THE RESEARCH FOUNDATION FOR THE STATE UNIVERSITY OF NEW YORK, Albany, NY (US)

(*) Notice: Subject to any disclaimer, the term of this patent is extended or adjusted under 35 U.S.C. 154(b) by 0 days.

(21) Appl. No.: 16/443,170

(22) Filed: Jun. 17, 2019

Related U.S. Application Data

(60) Provisional application No. 62/828,549, filed on Apr. 3, 2019, provisional application No. 62/758,029, filed on Nov. 9, 2018, provisional application No. 62/685,349, filed on Jun. 15, 2018, provisional application No. 62/854,080, filed on May 29, 2019.

(51) Int. Cl.
*G06N 10/00* (2019.01)
*H01F 38/14* (2006.01)

(52) U.S. Cl.
CPC ............. *G06N 10/00* (2019.01); *H01F 38/14* (2013.01)

(58) Field of Classification Search
None
See application file for complete search history.

(56) References Cited

U.S. PATENT DOCUMENTS

| 2012/0138887 A1* | 6/2012 | Zhang | ............... H01F 1/401 257/9 |
|---|---|---|---|
| 2012/0149581 A1 | 6/2012 | Fang | |

(Continued)

FOREIGN PATENT DOCUMENTS

| CN | 108430912 A | 8/2018 |
|---|---|---|
| CN | 108470216 A | 8/2018 |
| WO | 2018222311 A2 | 12/2018 |

OTHER PUBLICATIONS

Q. Li, D. E. Kharzeev, C. Zhang, Y. Huang, I. Pletikosic, A. V. Fedorov, R. D. Zhong, J. A. Schneeloch, G. D. Gu, and T. Valla, "Observation of the Chiral Magnetic Effect in ZrTe5" Nature Physics 12, 1-15 (2016).

(Continued)

*Primary Examiner* — Minh D A
*Assistant Examiner* — James H Cho
(74) *Attorney, Agent, or Firm* — Hoffmann & Baron, LLP

(57) ABSTRACT

An apparatus for performing quantum computing includes multiple qubits, each of at least a subset of the qubits comprising a loop formed of a Dirac or Weyl semimetal and having at least two stable quantum states. The apparatus further includes at least one terahertz cavity coupled with the qubits, the terahertz cavity being configured to detect the quantum states of the qubits. Each of at least the subset of qubits is configured to receive a circularly polarized radiation source. The radiation source is adapted to excite a chiral current in each of at least the subset of qubits, the quantum states of the plurality of qubits being a function of the chiral current.

20 Claims, 9 Drawing Sheets

(56) References Cited

U.S. PATENT DOCUMENTS

| | | | |
|---|---|---|---|
| 2016/0307112 A1 | 10/2016 | Dilabio et al. | |
| 2016/0351696 A1 | 12/2016 | Habib et al. | |
| 2017/0026095 A1* | 1/2017 | Ashrafi | H04B 7/0456 |
| 2018/0003753 A1* | 1/2018 | Bishop | G01R 29/0885 |

OTHER PUBLICATIONS

D. E. Kharzeev and Q. Li, "The Chiral Qubit: Quantum Computing with Chiral Anomaly" Arxiv 1903.07133, (2019).
Y. Gao, Y. Qin, Y. P. Liu, Y. L. Su, S. Kaushik, E. J. Philip, X. Chen, Z. Li, H. Weng, D. E. Kharzeev, M. K Liu, and J. Qi, "Chiral Terahertz Wave Emission from the Weyl Semimetal TaAs" Arxiv 1901.00986, 1-21 (2019).
K. Fukushima, D. E. Kharzeev, and H. J. Warringa, "Electric-Current Susceptibility and the Chiral Magnetic Effect" Nuclear Physics A 836, 311-336 (2010).
K. Fukushima, D. E. Kharzeev, and H. J. Warringa, "Chiral Magnetic Effect" Physical Review D 75, 074033 (2008).
R. Y. Chen, S. J. Zhang, J. A. Schneeloch, C. Zhang, Q. Li, G. D. Gu, and N. L. Wang, "Optical Spectroscopy Study of the Three-Dimensional Dirac Semimetal ZrTe5" Physical Review B—Condensed Matter and Materials Physics 92, 1-5 (2015).
Z.-G. Chen, R. Y. Chen, R. D. Zhong, J. Schneeloch, C. Zhang, Y. Huang, F. Qu, R. Yu, Q. Li, G. D. Gu, and N. L. Wang, "Spectroscopic Evidence for Bulk-Band Inversion and Three-Dimensional Massive Dirac Fermions in ZrTe5" Proceedings of the National Academy of Sciences 114, 816-821 (2017).
T. Liang, J. Lin, Q. Gibson, S. Kushwaha, M. Liu, W. Wang, H. Xiong, J. A. Sobota, M. Hashimoto, P. S. Kirchmann, Z.-X. Shen, R. J. Cava, and N. P. Ong, "Anomalous Hall Effect in ZrTe5" Nature Physics 14, 451-455 (2018).
Q. Ma, S. Y. Xu, C. K. Chan, C. L. Zhang, G. Chang, Y. Lin, W. Xie, T. Palacios, H. Lin, S. Jia, P. A. Lee, P. Jarillo-Herrero, and N. Gedik, "Direct Optical Detection of Weyl Fermion Chirality in a Topological Semimetal" Nature Physics 13, 842-847 (2017).
H. Wang, H. Wang, Y. Chen, J. Luo, Z. Yuan, J. Liu, Y. Wang, S. Jia, X. J. Liu, J. Wei, and J. Wang, "Discovery of Tip Induced Unconventional Superconductivity on Weyl Semimetal" Science Bulletin (2017).
H. Weng, X. Dai, and Z. Fang, "Transition-Metal Pentatelluride ZrTe5 and HfTe5: A Paradigm for Large-Gap Quantum Spin Hall Insulators" Physical Review X 4, (2014).
J. Wang, H. Wang, C. K. Li, H. Liu, J. Yan, J. Wang, J. Liu, Z. Lin, Y. Li, Y. Wang, L. Li, D. Mandrus, X. C. Xie, and J. Feng, "Chiral Anomaly and Ultrahigh Mobility in Crystalline HfTe5" Physical Review B 93, 165127 (2016).
Y. Luo, R. D. McDonald, P. F. S. Rosa, B. Scott, N. Wakeham, N. J. Ghimire, E. D. Bauer, J. D. Thompson, and F. Ronning, "Anomalous Electronic Structure and Magnetoresistance in TaAs2" Scientific Reports 6, 1-7 (2016).
D. Wu, J. Liao, W. Yi, X. Wang, P. Li, H. Weng, Y. Shi, Y. Li, J. Luo, X. Dai, and Z. Fang, "Giant Semiclassical Magnetoresistance in High Mobility TaAs2 Semimetal" Applied Physics Letters 108, 042105 (2016).
C. Zhang, E. Zhang, W. Wang, Y. Liu, Z. G. Chen, S. Lu, S. Liang, J. Cao, X. Yuan, L. Tang, Q. Li, C. Zhou, T. Gu, Y. Wu, J. Zou, and F. Xiu, "Room-Temperature Chiral Charge Pumping in Dirac Semimetals" Nature Communications 8, 13741 (2017).
T. Liang, Q. Gibson, M. N. Ali, M. Liu, R. J. Cava, and N. P. Ong, "Ultrahigh Mobility and Giant Magnetoresistance in the Dirac Semimetal Cd3As2" Nature Materials 14, 280-284 (2015).
Z. Wang, H. Weng, Q. Wu, X. Dai, and Z. Fang, "Three-Dimensional Dirac Semimetal and Quantum Transport in Cd3As2" Physical Review B 88, 125427 (2013).
Z. K. Liu, J. Jiang, B. Zhou, Z. J. Wang, Y. Zhang, H. M. Weng, D. Prabhakaran, S.-K. Mo, H. Peng, P. Dudin, T. Kim, M. Hoesch, Z. Fang, X. Dai, Z. X. Shen, D. L. Feng, Z. Hussain, and Y. L. Chen, "A Stable Three-Dimensional Topological Dirac Semimetal Cd3As2" Nature Materials 13, 677-681 (2014).
M. Neupane, S.-Y. Xu, R. Sankar, N. Alidoust, G. Bian, C. Liu, I. Belopolski, T.-R. Chang, H.-T. Jeng, H. Lin, A. Bansil, F. Chou, and M. Z. Hasan, "Observation of a Three-Dimensional Topological Dirac Semimetal Phase in High-Mobility Cd3As2" Nature Communications 5, 3786 (2014).
S. Borisenko, Q. Gibson, D. Evtushinsky, V. Zabolotnyy, B. Büchner, and R. J. Cava, "Experimental Realization of a Three-Dimensional Dirac Semimetal" Physical Review Letters 113, 027603 (2014).
S.-M. Huang, S.-Y. Xu, I. Belopolski, C.-C. Lee, G. Chang, T.-R. Chang, B. Wang, N. Alidoust, G. Bian, M. Neupane, D. Sanchez, H. Zheng, H.-T. Jeng, A. Bansil, T. Neupert, H. Lin, and M. Z. Hasan, "New Type of Weyl Semimetal with Quadratic Double Weyl Fermions" Proceedings of the National Academy of Sciences 113, 1180-1185 (2016).
S.-K. Jian and H. Yao, "Correlated Double-Weyl Semimetals with Coulomb Interactions: Possible Applications to HgCr2Se4 and SrSi2" Physical Review B 92, 045121 (2015).
M. Saba, M. Thiel, M. D. Turner, S. T. Hyde, M. Gu, K. Grosse-Brauckmann, D. N. Neshev, K. Mecke, and G. E. Schröder-Turk, "Circular Dichroism in Biological Photonic Crystals and Cubic Chiral Nets" Physical Review Letters 106, 103902 (2011).
D. E. Kharzeev, "The Chiral Magnetic Effect and Anomaly-Induced Transport" Progress in Particle and Nuclear Physics 75, 133-151 (2014).
J. Xiong, S. K. Kushwaha, T. Liang, J. W. Krizan, M. Hirschberger, W. Wang, R. J. Cava, and N. P. Ong, "Evidence for the Chiral Anomaly in the Dirac Semimetal Na3Bi" Science 350, 413-416 (2015).
X. Huang, L. Zhao, Y. Long, P. Wang, D. Chen, Z. Yang, H. Liang, M. Xue, H. Weng, Z. Fang, X. Dai, and G. Chen, "Observation of the Chiral-Anomaly-Induced Negative Magnetoresistance: In 3D Weyl Semimetal TaAs" Physical Review X 5, (2015).
X. Dai, "Weyl Semimetals: A Group Family Picture" Nature Materials 15, 5-6 (2015).
X. Dai, "Quantum Materials: Weyl Fermions Go into Orbit" Nature Physics 12, 727-728 (2016).
A. A. Soluyanov, D. Gresch, Z. Wang, Q. Wu, M. Troyer, X. Dai, and B. A. Bernevig, "Type-II Weyl Semimetals" Nature 527, 495-498 (2015).
S. A. Parameswaran, T. Grover, D. A. Abanin, D. A. Pesin, and A. Vishwanath, "Probing the Chiral Anomaly with Nonlocal Transport in Three-Dimensional Topological Semimetals" Physical Review X 4, 1-12 (2014).
N. Sirica, R. I. Tobey, L. X. Zhao, G. F. Chen, B. Xu, R. Yang, B. Shen, D. A. Yarotski, P. Bowlan, S. A. Trugman, J.-X. Zhu, Y. M. Dai, A. K. Azad, N. Ni, X. G. Qiu, A. J. Taylor, and R. P. Prasankumar, "Tracking Ultrafast Photocurrents in the Weyl Semimetal TaAs Using THz Emission Spectroscopy" Arxiv 1811.02723, pp. 1-22 (2018).
A. L. Levy, A. B. Sushkov, F. Liu, B. Shen, N. Ni, H. D. Drew, and G. S. Jenkins, "Optical Evidence of the Chiral Magnetic Anomaly in Weyl Semimetal TaAs" ArXiv 1810.05660, pp. 1-6 (2018).
D. Yang, J. Liang, C. Zhou, L. Sun, R. Zheng, S. Luo, Y. Wu, and J. Qi, "Powerful and Tunable THz Emitters Based on the Fe/Pt Magnetic Heterostructure" Advanced Optical Materials 4, 1944-1949 (2016).
T. J. Huisman and T. Rasing, "THz Emission Spectroscopy for THz Spintronics" Journal of the Physical Society of Japan 86, 1-5 (2017).
T. Kampfrath, M. Battiato, P. Maldonado, G. Eilers, J. Nötzold, S. Mährlein, V. Zbarsky, F. Freimuth, Y. Mokrousov, S. Blügel, M. Wolf, I. Radu, P. M. Oppeneer, and M. Münzenberg, "Engineering Ultrafast Spin Current Pulses Controlled by Magnetic Heterostructures" Nature Nanotechnology 8, 256-260 (2013).
T. Seifert, S. Jaiswal, U. Martens, J. Hannegan, L. Braun, P. Maldonado, F. Freimuth, A. Kronenberg, J. Henrizi, I. Radu, E Beaurepaire, Y. Mokrousov, P. M. Oppeneer, M. Jourdan, G. Jakob, D. Turchinovich, L. M. Hayden, M. Wolf, M. Münzenberg, M. Kläui, and T. Kampfrath, "Efficient Metallic Spintronic Emitters of Ultrabroadband Terahertz Radiation" Nature Photonics 10, 483-488 (2016).

(56) References Cited

OTHER PUBLICATIONS

D. E. Kharzeev, "Chiral Magnetic Superconductivity" EPJ Web of Conferences 137, 01011, pp. 1-7 (2017).
B. Z. Spivak and A. V. Andreev, "Magnetotransport Phenomena Related to the Chiral Anomaly in Weyl Semimetals" Physical Review B 93, 1-6 (2016).
J. Hofmann and S. Das Sarma, "Plasmon Signature in Dirac-Weyl Liquids" Physical Review B—Condensed Matter and Materials Physics 91, 1-5 (2015).
P. E. C. Ashby and J. P. Carbotte, "Chiral Anomaly and Optical Absorption in Weyl Semimetals" Physical Review B—Condensed Matter and Materials Physics, pp. 1-8 (2014).
H.-T. Chen, R. Kersting, and G. C. Cho, "Terahertz Imaging with Nanometer Resolution" Applied Physics Letters 83, 3009 (2003).
A J. Huber, F. Keilmann, J. Wittborn, J. Aizpurua, and R. Hillenbrand, "Terahertz Near-Field Nanoscopy of Nanodevices" Nano Letters 8, 3766-3770 (2008).
K. Moon, H. Park, J. Kim, Y. Do, S. Lee, G. Lee, H. Kang, and H. Han, "Subsurface Nanoimaging by Broadband Terahertz Pulse Near-Field Microscopy" Nano Letters 15, 549-552 (2015).
H. T. Stinson, A. Sternbach, O. Najera, R. Jing, A. S. Mcleod, T. V. Slusar, A. Mueller, L. Anderegg, H. T. Kim, M. Rozenberg, and D. N. Basov, "Imaging the Nanoscale Phase Separation in Vanadium Dioxide Thin Films at Terahertz Frequencies" Nature Communications Submitted, pp. 1-9 (2017).
G. B. Osterhoudt, L. K. Diebel, M. J. Gray, X. Yang, J. Stanco, X. Huang, B. Shen, N. Ni, P. J. W. Moll, Y. Ran, and K. S. Burch, "Colossal Bulk Photovoltaic Effect in a Weyl Semimetal" Arxiv 1712.04951, pp. 1-19 (2017).
D. E. Kharzeev, Y. Kikuchi, R. Meyer, and Y. Tanizaki, "Giant Photocurrent in Asymmetric Weyl Semimetals from the Helical Magnetic Effect" Physical Review B, pp. 1-7 (2018).
A. B. Sushkov, J. B. Hofmann, G. S. Jenkins, J. Ishikawa, S. Nakatsuji, S. Das Sarma, and H. D. Drew, "Optical Evidence for a Weyl Semimetal State in Pyrochlore Eu2Ir2O7" Physical Review B, pp. 1-10 (2015).
C. K. Chan, N. H. Lindner, G. Refael, and P. A. Lee, "Photocurrents in Weyl Semimetals" Physical Review B, pp. 1-6 (2017).
Y. Zhang, H. Ishizuka, J. Van Den Brink, C. Felser, B. Yan, and N. Nagaosa, "Photogalvanic Effect in Weyl Semimetals from First Principles" Physical Review B , pp. 1-6 (2018).
C. Zhang, A. Narayan, S. Lu, J. Zhang, H. Zhang, Z. Ni, X. Yuan, Y. Liu, J. H. Park, E. Zhang, W. Wang, S. Liu, L. Cheng, L. Pi, Z. Sheng, S. Sanvito, and F. Xiu, "Evolution of Weyl Orbit and Quantum Hall Effect in Dirac Semimetal Cd3As2" Nature Communications 8, 1272 (2017).
Chan et al., "When Chiral Photons Meet Chiral Fermions: Photoinduced Anomalous Hall Effects in Weyl Semimetals" Physical Review Letters 116, 1-5 (2016).
Doherty et al., "Towards a Room-Temperature Spin Quantum Bus in Diamond via Electron Photoionization, Transport, and Capture" Physical Review X 6, 1-14 (2016).
Dragoman et al., "Graphene-based Room-Temperature Implementation of a Modified Deutsch-Jozsa Quantum Algorithm" Nanotechnology 26, 1-8 (2015).
Kharzeev et al., "The Chiral Qubit: Quantum Computing with Chiral Anomaly", 1-7 (2019).
Kharzeev et al., "Anomaly Induced Chiral Magnetic Current in a Weyl Semimetal: Chiral Electronics", Physical Review B 88, 115119, 1-5 (2013).
Li et al., "Chiral Magnetic Effect in Condensed Matter Systems", Nuclear Physics A 956, 107-11 (2016).
Li et al., "Chiral Magnetic Effect in ZrTe5", Nature Physics 12, 550-555 (2016).
Li et al., "Chiral Magnetic Effect Generates Quantum Current", Nature Physics 1-4 (2016).
T. Mao, "Theoretical Studies of Topological DIII-class chains and Weyl semimetals", University of Hong Kong, 1-3, 2015.
Mashkovtsev et al., "Nitrogen Atoms Encased in Cavities within the Beryl Structure as Candidates for Qubits", Appl. Magn. Reson 28, 401-409 (2005).
Smejkal et al., "Topological Antiferromagnetic Spintronics", Nature Physics 14, 242-251 (2018).
Tokura et al., "Emergent Functions of Quantum Materials", Nature Physics 13, 1056-1068 (2017).
Xie et al., "Weyl Nodes in Andreev Spectra of Multiterminal Josephson Junctions: Chern Numbers, Conductances, and Supercurrents", Physical Review B 97, 1-8 (2018).
Zhang et al., "Towards the Manipulation of Topological States of Matter: A Perspective From Electron Transport", Science Bulletin 63, 580-594 (2018).
Zhang et al., "Chirality Josephson Current Due to a Novel Quantum Anomaly in Inversion-Asymmetric Weyl Semimetals", Physical Review Letters 121, 1-7 (2018).
T. Kampfrath, A. Sell, G. Klatt, A. Pashkin, S. Mährlein, T. Dekorsy, M. Wolf, M. Fiebig, A. Leitenstorfer, and R. Huber, "Coherent Terahertz Control of Antiferromagnetic Spin Waves" Nature Photonics 5, 31-34 (2010).
J. Zhang, X. Chen, S. Mills, T. Ciavatti, Z. Yao, R. Mescall, H. Hu, V. Semenenko, Z. Fei, H. Li, V. Perebeinos, H. Tao, Q. Dai, X. Du, and M. Liu, "Terahertz Nanoimaging of Graphene" ACS Photonics 5, 2645-2651 (2018).
P. Klarskov, H. Kim, V. L. Colvin, and D. M. Mittleman, "Nanoscale Laser Terahertz Emission Microscopy" ACS Photonics 4, 2676-2680 (2017).
Z. Fei, A. S. S. Rodin, W. Gannett, S. Dai, W. Regan, M. Wagner, M. K. K. Liu, A. S. S. McLeod, G. Dominguez, M. Thiemens, A. H. H. Castro Neto, F. Keilmann, A. Zettl, R. Hillenbrand, M. M. M. Fogler, and D. N. N. Basov, "Electronic and Plasmonic Phenomena at Graphene Grain Boundaries." Nature Nanotechnology 8, 821-5 (2013).
J. Chen, M. Badioli, P. Alonso-González, S. Thongrattanasiri, F. Huth, J. Osmond, M. Spasenović, A. Centeno, A. Pesquera, P. Godignon, A. Zurutuza Elorza, N. Camara, F. J. G. de Abajo, R. Hillenbrand, and F. H. L. Koppens, "Optical Nano-Imaging of Gate-Tunable Graphene Plasmons" Nature 487, 77 (2012).
Z. Fei, A. S. Rodin, G. O. Andreev, W. Bao, A. S. McLeod, M. Wagner, L. M. Zhang, Z. Zhao, M. Thiemens, G. Dominguez, M. M. Fogler, A. H. Castro Neto, C. N. Lau, F. Keilmann, and D. N. Basov, "Gate-Tuning of Graphene Plasmons Revealed by Infrared Nano-Imaging." Nature 487, 82 (2012).
P. Alonso-Gonzalez, A. Y. Nikitin, F. Golmar, A. Centeno, A. Pesquera, S. Velez, J. Chen, G. Navickaite, F. Koppens, A. Zurutuza, F. Casanova, L. E. Hueso, and R. Hillenbrand, "Controlling Graphene Plasmons with Resonant Metal Antennas and Spatial Conductivity Patterns" Science 344, 1369-1373 (2014).
S. Dai, Q. Ma, M. K. Liu, T. Andersen, Z. Fei, M. D. Goldflam, M. Wagner, K. Watanabe, T. Taniguchi, M. Thiemens, F. Keilmann, G. C. a. M. Janssen, S.-E. Zhu, P. Jarillo-Herrero, M. M. Fogler, and D. N. Basov, "Graphene on Hexagonal Boron Nitride as a Tunable Hyperbolic Metamaterial" Nature Nanotechnology 1-6 (2015).
S. Dai, Q. Ma, T. Andersen, a. S. Mcleod, Z. Fei, M. K. Liu, M. Wagner, K. Watanabe, T. Taniguchi, M. Thiemens, F. Keilmann, P. Jarillo-Herrero, M. M. Fogler, and D. N. Basov, "Subdiffractional Focusing and Guiding of Polaritonic Rays in a Natural Hyperbolic Material" Nature Communications 6, 6963 (2015).
Z. Fei, E. G. Iwinski, G. X. Ni, L. M. Zhang, W. Bao, A. S. Rodin, Y. Lee, M. Wagner, M. K. Liu, S. Dai, M. D. Goldflam, M. Thiemens, F. Keilmann, C. N. Lau, A. H. Castro-Neto, M. M. Fogler, and D. N. Basov, "Tunneling Plasmonics in Bilayer Graphene" Nano Letters 15, 4973 (2015).
G. X. Ni, H. Wang, J. S. Wu, Z. Fei, M. D. Goldflam, F. Keilmann, B. Özyilmaz, A. H. Castro Neto, X. M. Xie, M. M. Fogler, and D. N. Basov, "Plasmons in Graphene Moiré Superlattices" Nature Materials 14, 1217 (2015).
A. Woessner, M. B. Lundeberg, Y. Gao, A. Principi, P. Alonso-González, M. Carrega, K. Watanabe, T. Taniguchi, G. Vignale, M. Polini, J. Hone, R. Hillenbrand, and F. H. L. Koppens, "Highly Confined Low-Loss Plasmons in Graphene-boron Nitride Heterostructures" Nature Materials 14, 421-425 (2014).

(56) References Cited

OTHER PUBLICATIONS

S. Kaushik, E. J. Philip, and D. E. Kharzeev, "Chiral Magnetic Photocurrent in Dirac and Weyl Materials" Arxiv 1810.02399, Physical Review B 99, 075150 (2019).

M. Liu, H. Y. Hwang, H. Tao, A. C. Strikwerda, K. Fan, G. R. Keiser, A. J. Sternbach, K. G. West, S. Kittiwatanakul, J. Lu, S. A. Wolf, F. G. Omenetto, X. Zhang, K. A. Nelson, and R. D. Averitt, "Terahertz-Field-Induced Insulator-to-Metal Transition in Vanadium Dioxide Metamaterial" Nature 487, 345-348 (2012).

C. Li and T.-W. Chou, "Single-Walled Carbon Nanotubes as Ultrahigh Frequency Nanomechanical Resonators" Physical Review B 68, 073405 (2003).

C. Belacel, Y. Todorov, S. Barbieri, D. Gacemi, I. Favero, and C. Sirtori, "Optomechanical Terahertz Detection with Single Meta-Atom Resonator" Nature Communications 8, 1578 (2017).

H. O. Moser, B. D. F. Casse, O. Wilhelmi, and B. T. Saw, "Terahertz Response of a Microfabricated Rod-Split-Ring-Resonator Electromagnetic Metamaterial" Physical Review Letters 94, 063901 (2005).

T. Driscoll, G. O. Andreev, D. N. Basov, S. Palit, S. Y. Cho, N. M. Jokerst, and D. R. Smith, "Tuned Permeability in Terahertz Split-Ring Resonators for Devices and Sensors" Applied Physics Letters 91, 062511(2007).

P. Lodahl, S. Mahmoodian, S. Stobbe, A. Rauschenbeutel, P. Schneeweiss, J. Volz, H. Pichler, and P. Zoller, "Chiral Quantum Optics" Nature 541, 473-480 (2017).

T. Karzig, C. E. Bardyn, N. H. Lindner, and G. Refael, "Topological Polaritons" Physical Review X 5, 1-10 (2015).

F. De Juan, A. G. Grushin, T. Morimoto, and J. E. Moore, "Quantized Circular Photogalvanic Effect in Weyl Semimetals" Nature Communications 8, 15995 (2017).

\* cited by examiner

QUANTUM COMPUTING USING CHIRAL QUBITS

CROSS-REFERENCE TO RELATED APPLICATIONS

This application claims priority to U.S. Provisional Patent Application Nos. 62/685,349 filed Jun. 15, 2018 entitled "Chiral Qubit System and Method," 62/758,029 filed Nov. 9, 2018 entitled "Chiral Qubit System and Method," 62/828,549 filed Apr. 3, 2019 entitled "Chiral Qubit System and Method," and 62/854,080 filed May 29, 2019 entitled "Chiral Qubit System and Method," the disclosures of which are incorporated by reference herein in their entireties for all purposes.

STATEMENT OF GOVERNMENT RIGHTS

This invention was made with government support under Grant Nos. DE-SC0012704, DE-SC0017662 and DE-FG02-88ER40388 awarded by the Department of Energy. The government has certain rights in the invention.

BACKGROUND

The present invention relates generally to the electrical, electronic and computer arts, and, more particularly, to quantum computing.

Quantum computing involves the use of quantum-mechanical phenomena such as superposition and entanglement to perform computation. A quantum computer is used to perform such computation. There are currently two primary approaches to physically implementing a quantum computer: analog and digital. Analog approaches include quantum simulation, quantum annealing, and adiabatic quantum computation. Digital quantum computers employ quantum logic gates to perform computation. Both analog and digital approaches for implementing a quantum computer use quantum bits, typically referred to as qubits, which represent the basic units of quantum information.

Quantum computing based on superconducting qubits has made substantial progress recently. (See, e.g., J. M. Gambetta et al., "Building Logical Qubits in a Superconducting Quantum Computing System," *npj Quantum Information* 3, Article No. 2, January 2017, pp. 1-7). However, the reliance on superconductivity imposes severe constraints on quantum processors due, at least in part, to the need to cool the qubits to very low temperatures (e.g., about 10 millikelvins (mK)), and a magnitude of the superconducting gap limits the operation frequency of quantum processors to the gigahertz (GHz) range.

Another significant challenge for conventional quantum computing systems is controlling the loss of quantum coherence, known as decoherence. Quantum computers require that coherent states be preserved and that decoherence is managed in order to actually perform quantum computation. Decoherence times for current quantum computing systems are typically on the order of a fraction of a millisecond, which significantly limits the number of operations that can be performed in a prescribed period of time. As a result, time-consuming tasks may render some quantum algorithms inoperable, since maintaining the state of the qubits for a long enough duration will eventually corrupt the superpositions.

SUMMARY

The present invention, as manifested in one or more embodiments, comprises a method and apparatus for performing quantum computing which eliminates or at least substantially minimizes, one or more of the above-noted challenges facing conventional quantum computing implementations. One or more aspects of the invention, according to illustrative embodiments thereof, involve the use of qubits formed using chiral materials, referred to herein as chiral qubits, in place of qubits formed using standard superconducting materials. Chiral qubits formed according to embodiments of the invention beneficially achieve greater coherence times (e.g., about 100 nanoseconds (ns)). Additionally, chiral qubits according to aspects of the invention allow the implementation of quantum gates at frequencies of about 10 terahertz (THz) or higher. Thus, while the chirality coherence time may still be considered short (with a chirality flipping rate in the GHz frequency range), the ability to form quantum gates comprising chiral qubits that operate at clock frequencies of about 10 THz or higher leads to a ratio of coherence time to gate time on the order of about $10^4$ or higher, which is sufficient for the implementation of quantum error correction algorithms. Advantageously, chiral qubits formed according to one or more aspects of the invention achieve such superior performance metrics without a need to cool the qubits to typical superconductivity temperatures (e.g., about 10 mK).

An exemplary apparatus for performing quantum computing, according to an aspect of the invention, includes multiple qubits, each of at least a subset of the qubits comprising a loop formed of a Dirac or Weyl semimetal and having at least two stable quantum states. The apparatus further includes at least one terahertz cavity coupled with the qubits, the terahertz cavity being configured to detect the quantum states of the qubits. Each of at least the subset of qubits is configured to receive a circularly polarized radiation source. The radiation source is adapted to excite a chiral current in each of at least the subset of qubits, the quantum states of the plurality of qubits being a function of the chiral current.

In another aspect, an exemplary method for performing quantum computing includes: providing a plurality of qubits, each of at least a subset of the qubits comprising a loop formed of a Dirac or Weyl semimetal and having at least two stable quantum states, and at least one terahertz cavity coupled with the plurality of qubits, the terahertz cavity being configured to detect the quantum states of the qubits; and exposing at least the subset of qubits to a circularly polarized radiation source, whereby a chiral current is excited in each of at least the subset of qubits, the quantum states of the plurality of qubits being a function of the chiral current.

As may be used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

Various units, circuits, modules, or other components may be described herein as being "configured to" perform a particular task or tasks. In such contexts, the term "configured to" is intended to be construed broadly as a recitation of structure generally meaning "having circuitry that" performs the task or tasks during operation. As such, the unit/circuit/module/component can be configured to perform the subject task or tasks even when the unit/circuit/module/ component/is not currently powered on. In general, circuitry that forms the structure corresponding to "configured to" may include hardware circuits and/or memory storing program instructions executable to implement the operation. Similarly, various units/circuits/modules/components may be described as performing a task or tasks, for convenience in the description. Such descriptions should be interpreted as including the phrase "configured to." Reciting a unit/circuit/ module/component that is configured to perform one or more tasks is expressly intended not to invoke a 35 U.S.C. § 112, paragraph (f) interpretation for that unit/circuit/ module/component.

One or more embodiments of the invention, or elements and features thereof, can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including memory and at least one processor that is coupled to the memory and operative to perform, or to facilitate the performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Aspects of the present invention can provide substantial beneficial technical effects. For example, a chiral qubit adapted for use in a quantum computing apparatus according to one or more embodiments of the present invention achieves one or more of:

greater coherence duration;
ability to operate at higher switching frequencies;
operation at a substantially higher temperature, even room temperature;
ability to manipulate chiral magnetic current using light (e.g., circularly polarized light beam), which can thereby achieve gate times on the order of tens of THz.

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Principles of the present disclosure will be described herein in the context of apparatus, systems and methods for quantum computing using qubits comprising chiral materials. It is to be appreciated, however, that the specific apparatus, systems and/or methods illustratively shown and described herein are to be considered exemplary as opposed to limiting. Moreover, it will become apparent to those skilled in the art given the teachings herein that numerous modifications can be made to the embodiments shown that are within the scope of the appended claims. That is, no limitations with respect to the embodiments shown and described herein are intended or should be inferred.

Efficient and reliable quantum computing requires controllable and robust qubits. In modern quantum computers, the qubits are typically realized as superconducting Josephson junction devices cooled down to tens of mK temperatures or as trapped ions/cold atoms held in place by laser beams (i.e., laser trapping). The necessity to maintain such low temperatures or laser trapping is a primary obstacle to a commercially viable, mass-producible quantum computer. As previously explained, quantum computers utilizing superconducting qubits face a number of other significant challenges. Some of these other inherent challenges of superconducting qubits include, but are not limited to, having an operation frequency limited to the gigahertz (GHz) range based on a magnitude of the superconducting gap, very short coherence time (on the order of about 100 microseconds (μs)), slow gate time (on the order of about 100 nanoseconds (ns)), low fault tolerance, and poor scalability due at least in part to frequency collision in cross resonance gates, among other factors.

Figure 1:
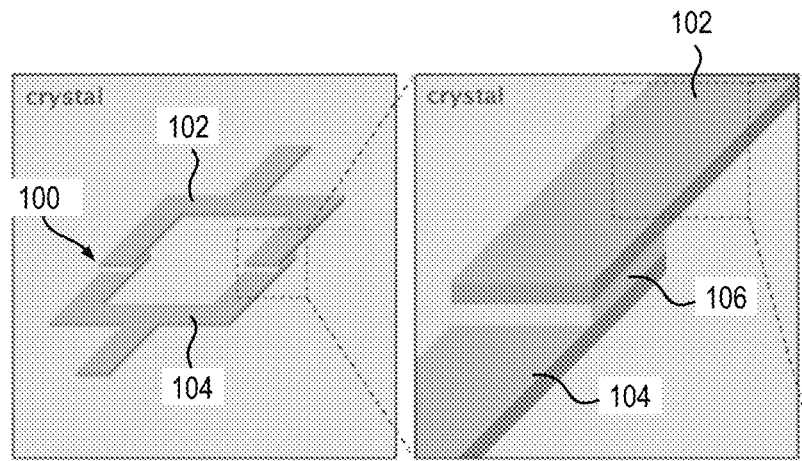
FIG. 1 conceptually depicts an illustrative Josephson junction which may be used to implement a superconducting qubit in a quantum computer.

Conventional superconducting qubits make use of the Josephson effect, a phenomenon whereby a current flows indefinitely long without any voltage applied across a device known as a Josephson junction. With reference to FIG. 1, an illustrative Josephson junction 100 is shown which consists of two or more superconductor materials (e.g., aluminum), 102 and 104, coupled by a weak link 106 (e.g., aluminum oxide). In this illustration, the two superconductor materials 102, 104 are formed in the shape of overlapping segments of a ring. The weak link 106 may consist of a thin insulating barrier (known as a superconductor-insulator-superconductor junction) acting as a tunnel junction, a short section of non-superconducting metal, or a physical constriction that weakens the superconductivity at the point of contact. As previously stated, the operating temperature of the superconducting qubit is about 10 mK.

The present invention, as manifested in one or more embodiments, comprises an apparatus and method for performing quantum computing which beneficially eliminates, or at least substantially minimizes, one or more of the above-noted challenges facing conventional quantum computing implementations. Aspects of the invention, according to illustrative embodiments thereof, use novel chiral qubits, comprising chiral materials, in place of superconducting qubits to achieve superior performance. Advantageously, the chiral qubits can maintain coherence at much higher temperatures (e.g., 150 degrees K, or even room temperature) compared to superconducting qubits. Moreover, a quantum device according to one or more embodiments of the invention can be controlled by electromagnetic radiation with high gate and readout fidelity.

Embodiments of the invention exploit a chiral magnetic effect (CME) and a corresponding nearly dissipationless chiral magnetic current in three-dimensional (3D) chiral materials (e.g., Weyl or Dirac semimetals) to demonstrate a new type of qubit, referred to herein as a chiral qubit, capable of operating at room temperature, THz frequencies, and having a large ratio of coherence time to gate time, on the order of about $10^4$. In simple terms, CME is the generation of electric current along an external magnetic field induced by chirality imbalance between left- and right-handed fermions in the presence of a magnetic field. If the densities of the right- and left-handed fermions are different, the currents of positive and negative charges do not compensate each other, and the system develops a net electric current; this net electric current is called the chiral magnetic current and the overall effect is referred to as the CME. The corresponding current can be computed by field-theoretical methods and is given by the following expression, in the case of conserved chirality:

$$\vec{J} = \sigma_{CME} \vec{B}, \quad [1]$$

where $\vec{J}$ represents CME current, $\sigma_{CME}$ represents the CME conductivity tensor, and $\vec{B}$ represents the magnetic field. CME can be induced by the electric and magnetic fields being parallel relative to one another.

Dirac semimetals (e.g., zirconium pentatelluride ($ZrTe_5$), cadmium arsenide ($Cd_3As_2$), trisodium bismuthide ($Na_3Bi$)) and Weyl semimetals (e.g., tantalum arsenide (TaAs), niobium arsenide (NbAs), niobium phosphide (NbP), and tantalum phosphide (TaP)) contain electrons that act as massless relativistic particles. These Dirac and Weyl semimetals exhibit chiral anomaly, among other interesting characteristics. The anomaly occurs when both electric and magnetic fields are applied to the material and has measurable consequences for electric transport. This chiral anomaly can also occur in Dirac and Weyl semimetals when real electromagnetic (EM) fields are replaced by strain-induced pseudo-EM fields.

In 3D chiral materials, gapless fermions are described by eigenstates of Weyl or Dirac equations with a definite chirality (projection of spin onto momentum). An electric current in such materials can be induced by external gauge fields with non-trivial topology, for example by parallel electric and magnetic fields, which enable the transfer of chirality from an electromagnetic field to the chiral fermions. In the absence of chirality flipping, this CME gives rise to a dissipation-free transport of charge that is similar to superconductivity but can exist at much higher temperatures, even room temperature. The chirality-flipping transitions introduce dissipation and limit the coherence time of the chiral magnetic current. Therefore, understanding the mechanism of chirality flipping is important for realizing an efficient chiral qubit. Factors that contribute to chirality flipping include, but are not limited to, band topology, Fermi energy (chemical potential), electron-phonon coupling, Fermi velocity, magnetism, strain/pressure, spin-orbital coupling (SOC), and dimensionality. Understanding the role and interplay of these factors is an important mechanism in gaining control of the chiral flipping rate in chiral materials, as will be described in further detail herein below.

In presently available Dirac and Weyl semimetals, the chirality flipping rate is in the 1 GHz to 1 THz range (1 THz=1/picosecond (ps)); this leads to a quantum coherence time of the chiral qubit of up to 1 ns. The chiral current can be controlled by light with a frequency of up to about 10 THz, which determines the gate time of the chiral qubit of about 0.1 ps. Therefore, a ratio of coherence time to gate time of the chiral qubit according to embodiments of the invention is about $10^4$, which potentially makes it a high-fidelity device capable of operating at frequencies of up to 10 THz, about $10^4$ faster than existing superconducting qubits, and at room temperature.

Figure 2A:
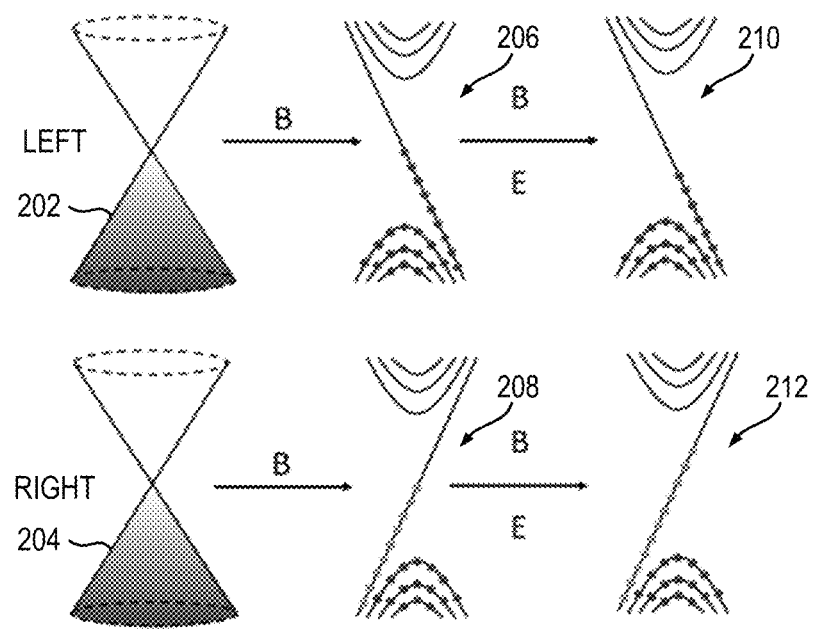
FIG. 2A conceptually depicts the generation of chiral charge imbalance using a Weyl or Dirac three-dimensional (3D) cone when no field is present, and using one-dimensional cones when a magnetic field is present and when magnetic and electric fields are present.

In one or more embodiments, a non-dissipative chiral charge transport enabled by the chiral anomaly provides a direct link between gauge field theory and experiment. The chiral anomaly of quantum electrodynamics dictates that the parallel external electric and magnetic fields generate the chiral charge with a rate $$\left(\frac{d\rho_5}{dt}\right)$$

given by the following expression:

$$\frac{d\rho_5}{dt} = \frac{e^2}{4\pi^2\hbar^2 c} E \cdot B - \frac{\rho_5}{\tau_V}, \quad [2]$$

where the first term is induced by the anomaly, and the second term takes into account the chirality flipping transitions between the left- and right-handed fermions with a scattering time $\tau_V$, as shown in FIG. 2A. FIG. 2A conceptually depicts the generation of chiral charge imbalance using a Weyl or Dirac 3D cone when no field is present (left column), and using one-dimensional "cones" when a magnetic field is present (center column) and when magnetic and electric fields are present (right column).

With reference to FIG. 2A, parallel external electric (E) and magnetic (B) fields generate the chiral charge imbalance. Left and right Weyl or Dirac 3D cones, 202 and 204, respectively, are shown when no field is present. In graphs 206 and 208, left and right one-dimensional (1D) "cones," respectively, are depicted with Landau levels under a magnetic field. In graphs 210 and 212, left and right 1D cones, respectively, illustrate the chiral anomaly when both magnetic and electric fields are present.

This chirality-flipping process is a major obstacle preventing fully non-dissipative transport, since it depletes the amount of chiral charge that can be produced. The quasiparticles with different chirality are converted to each other with a rate that is in the GHz-THz frequency range, possibly via magnetic impurities, band bending and band mixing, or electron-phonon coupling. Understanding and tuning the chirality-flipping rate is an important factor in achieving low dissipation electronic and photonic quantum devices.

The scattering time $\tau_V$ can be directly measured by taking advantage of the nonlocal transport behavior of chiral particles. This nonlocal transport is a result of the chiral charge diffusion through the crystal. Nonlocal voltage follows a diffusion formula $$V(x) \propto V_0 e - \frac{|x|}{L_v},$$

where $L_v = \sqrt{D_v \tau_v}$, $D_v$ is a diffusion constant related to mobility $\mu_v$ by the Einstein relation $$\mu_v = \frac{eD_v}{k_B T},$$

Figure 2B:
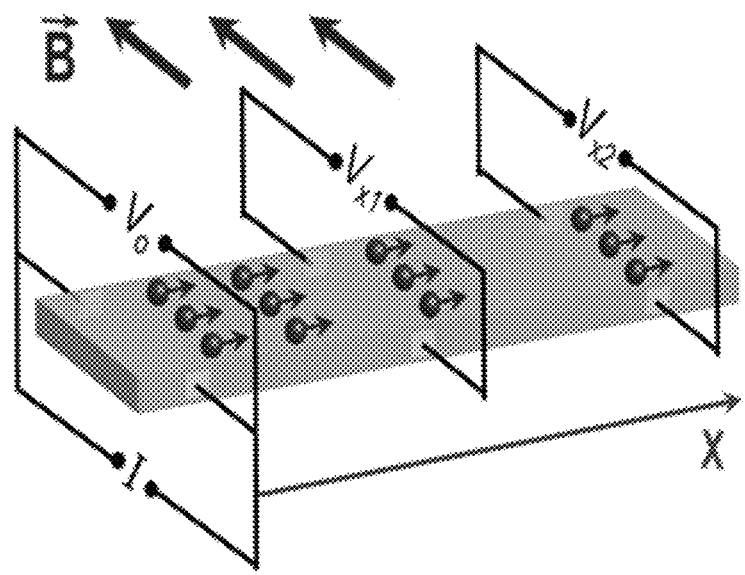
FIG. 2B is a schematic view depicting an illustrative chiral particle diffusion process, leading to a nonlocal voltage drop along a magnetic field direction at different distances.

$V_0$ is source-drain voltage at a distance x=0 from the source-drain, as shown in FIG. 2B.

FIG. 2B is a schematic view depicting an illustrative chiral particle diffusion process, leading to a nonlocal voltage drop along a magnetic field direction at varying distances from the source-drain (x=0). Mobility can be obtained from conductivity and Hall coefficient measurements. With reference to FIG. 2B, multiple Hall-bar terminals can be used to measure the nonlocal voltages $V_{x1}$ and $V_{x2}$, at distances x1 and x2 away from the source-drain, respectively, to determine $L_v$, that gives rise to $\tau_v$.

It is to be appreciated that in addition to the transport measurements described above, chirality flipping rate can also be determined by optical measurements. The chirality flipping rate in different chiral materials is typically in the 0.001-1 THz frequency range. The effect of chirality flipping is reduced when the frequency of the external electromagnetic field is higher than this characteristic frequency. Investigating the optical properties of the low scattering, low dissipation electron transport and photonic properties of chiral bulk materials and nanocrystals at the THz frequency range can be beneficial in determining the chiral flipping rate.

Figure 3:
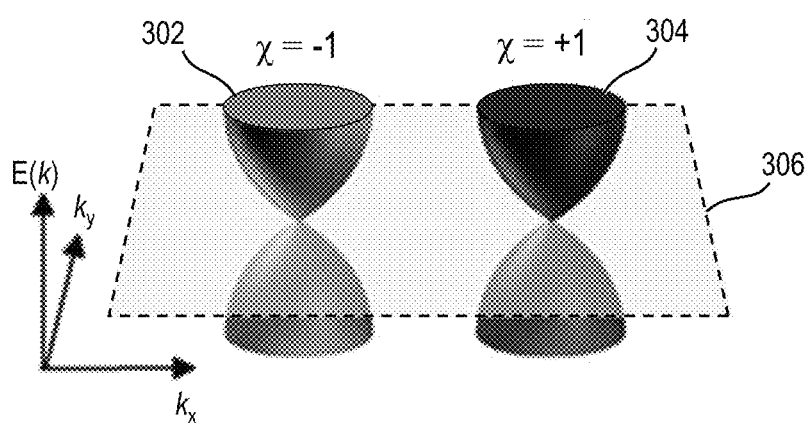
FIG. 3 conceptually depicts a Weyl semimetal, represented as two spatially separated, massless Weyl nodes with distinct chiralities, $\chi=-1$ and $+1$.

FIG. 3 conceptually depicts a Weyl semimetal, represented as two spatially separated, massless Weyl nodes, cones 302 and 304, with distinct chiralities, $\chi=-1$ and $+1$, respectively. In Weyl semimetals, conduction and valence bands touch linearly near a Fermi energy ($E_F$) plane 306. Weyl states are closely related to Dirac states, where both time reversal and crystal inversion symmetries are preserved. In contrast, Weyl states emerge when one of these symmetries is broken. The band touching points in a Weyl semimetal (so-called Weyl nodes) always come in spatially separated pairs of opposite chirality ($\chi=\pm1$), as shown in FIG. 3, which distinguish them from Dirac semimetals having two degenerate Weyl nodes (doubly degenerated bands) of opposite chirality that form one Dirac node. The Berry curvature in a Weyl semimetal becomes singular at the Weyl node, creating an effective magnetic monopole in the k-space.

The chiral magnetic current exists in 3D chiral materials at temperatures of about 150 K or higher. More particularly, CME exists at room temperature in Dirac semimetals, even with small band gap, band non-linearity, and crystal deformation. In an illustrative embodiment involving massless or massive 3D Dirac fermions in $ZrTe_5$, a linear relationship is observed between the zero-magnetic field (B) absorption and the photon energy. A bandgap of about 10 millielectronvolt (meV) and a square root magnetic field ($\sqrt{B}$) dependence of the Landau level (LL) transition is observed at magnetic fields. Reemergence of intra-LL transitions at magnetic fields greater than about 17 Tesla reveals an energy cross between the two zeroth LLs, which reflects an inversion between the bulk conduction and valence bands.

Figure 4:
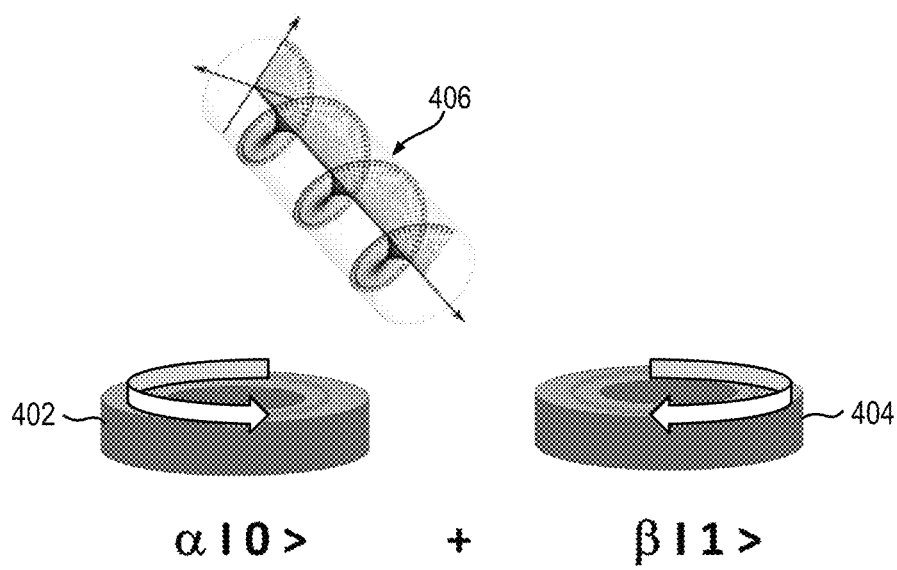
FIG. 4 conceptually depicts two basis quantum states of an exemplary chiral qubit, according to an embodiment of the present invention.

At the heart of the chiral qubit according to one or more embodiments of the invention is a submicron-scaled Weyl or Dirac semimetal ring structure, with |0> and |1> quantum states corresponding to the symmetric and antisymmetric superpositions of quantum states describing chiral fermions circulating along the ring counter-clockwise and clockwise, respectively. FIG. 4 conceptually depicts two basis quantum states of an exemplary chiral qubit, according to an embodiment of the invention. The chiral qubit in this embodiment is preferably formed as a submicron-scaled ring structure comprising chiral material (e.g., Dirac or Weyl semimetal), although it is to be appreciated that the specific material, shape and/or dimensions of the chiral qubit are not limited by embodiments of the invention.

FIG. 4 illustrates the chiral qubit ring structure in two different quantum states; namely, a first quantum state $\alpha|0>$ and a second quantum state $\beta|1>$. The $\alpha|0>$ and $\beta|1>$ quantum states in this embodiment correspond to the symmetric and antisymmetric superpositions of quantum states describing chiral fermions circulating along the ring structure counter-clockwise 402 and clockwise 404, respectively. The assignment of quantum states to a particular direction in which the chiral fermions circulate in the ring structure is essentially arbitrary. These chiral magnetic currents, attributable to the circulation of chiral fermions, can be controlled by circularly polarized THz (e.g., far infrared (IR)) incident radiation 406. In one or more embodiments, the quantum states corresponding to the non-dissipative CME current circulating counter-clockwise and clockwise form the basis of the chiral qubit. The incident circularly polarized light 406 creates quantum superpositions of these states.

As previously explained, FIG. 4 shows the basis quantum states of the chiral qubit corresponding to the persistent current circulating clockwise 404 and counter-clockwise 402 in the ring structure comprising a Weyl semimetal (WSM) or Dirac semimetal (DSM), in accordance with one or more embodiments of the invention. These states reflect the chirality of gapless fermion quasi-particles in WSM/DSM. The logic operation on the chiral qubit is performed by shining a circularly polarized radiation on the ring structure. The circularly polarized radiation will switch the chirality of the fermions circulating in the WSM/DSM ring structure. More particularly, the circularly polarized light irradiation induces transitions between the basis states of the chiral qubit and creates the quantum superpositions of these states, in one or more embodiments; this mechanism is used to implement a reversible quantum logic gate, according to aspects of the invention. The weights of the basis states in this quantum superposition will be a function of the intensity and duration of the radiation pulse 406. The action of the optical irradiation in the chiral qubit is similar to the microwave irradiation capacitively coupled to a superconducting qubit made of Josephson junctions for qubit operation. In the case of chiral qubits, far IR waveguides may be used.

Figure 5:
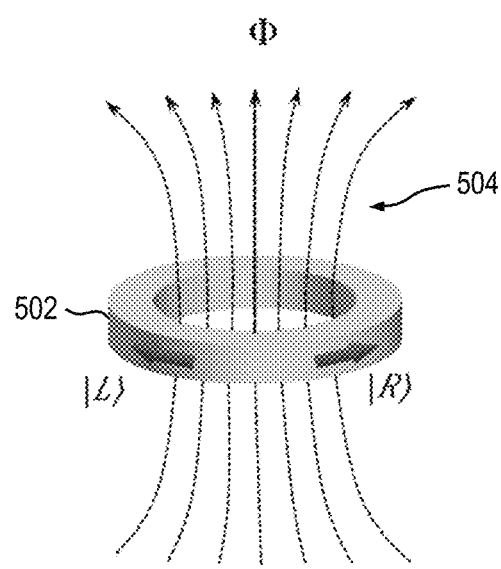
FIG. 5 conceptually depicts an exemplary ring-shaped chiral qubit with flux lines through the ring attributable to quantum currents flowing in the qubit, according to an embodiment of the present invention.

FIG. 5 conceptually depicts an exemplary ring-shaped chiral qubit 502 with flux lines through the ring attributable to quantum currents flowing in the qubit, according to an embodiment of the invention. In one or more embodiments, the chiral qubit ring 502 is made of a Dirac or Weyl semimetal, as previously described. The clockwise and counter-clockwise quantum currents form the $|L\rangle$ and $|R\rangle$ quantum states, respectively, controlled by an external magnetic field. A fractional flux 504 through the ring creates a quantum superposition of the $|L\rangle$ and $|R\rangle$ quantum states.

By way of example only and without limitation, consider a thin ring 502 of radius $R \sim 1$ μm and thickness $d \ll R$ made of a Dirac or Weyl semimetal, as shown in FIG. 5. Let this ring 502 interact with an external electromagnetic field of THz frequency. Since 1 THz corresponds to a wavelength of 0.3 mm, the wavelength of electromagnetic field $\lambda$ is much larger than the thickness of the ring $d \ll \lambda$, and the system can be modelled by the Dirac Lagrangian $$\mathcal{L} = \bar{\psi}\{i\gamma^0 D_0 + iv_F \gamma^i D_i\}\psi - \frac{1}{4}F_{\mu\nu}^2 \text{ and} \quad [3]$$

$$\mathcal{L} = \psi_R^\dagger\{i(D_0 + v_F D_1)\}\psi_R + \psi_L^\dagger\{i(D_0 - v_F D_1)\}\psi_L$$

describing the interaction of (1+1) dimensional fermions with the (3+1) dimensional gauge field, where the covariant derivatives $D_\mu \equiv \partial_\mu + ieA_\mu$, is the Dirac spinor that has 4 components in (3+1) dimensions, and 2 components in (1+1) dimensions, $\gamma_\mu$ is the set of Dirac matrices satisfying the anticommutation relations $\{\gamma_\mu,\gamma_\nu\}=2g_{\mu\nu}$, $\bar{\psi}=\psi^\dagger\gamma^0$; the Minkowski metric is defined as $g^{\mu\nu}=\text{diag}(+1,-1,-1,-1)$ and $g^{\mu\nu}=\text{diag}(+1,-1)$ in (3+1) and (1+1) dimensions, respectively.

In this setup, the electric field entering the anomaly equation $$\frac{d(N_R - N_L)}{dt} = -\frac{e}{\pi}\int dx E_1 = \frac{e}{\pi}\frac{d}{dt}\int dx A_1 \quad [4]$$

can be seen as resulting from the change in time of the loop integral $\oint A_1 dx$ that, by Stokes theorem, is equal to magnetic flux threading the ring. Using a Coulomb gauge and polar coordinates, the magnetic flux $\Phi$ through the ring can be related to the gauge potential by choosing $A_\theta = \Phi/(2\pi R)$.

The Dirac Hamiltonian corresponding to equation [3] above then takes the form $$\hat{H} = \hbar\omega\left(-i\partial_\theta + \frac{\Phi}{\Phi_0}\right), \quad [5]$$

where $\omega = v_F/R$ and $\Phi_0 \equiv h/e$ is the flux quantum, and the Planck constant h has been restored.

The two eigenstates of $\hat{\sigma}_z$ in equation [5] above correspond to the right- and left-handed chiral fermions. In the ring setup, they are the clockwise and counter-clockwise rotating fermions, shown in FIG. 5. The corresponding stationary eigenstates of the Hamiltonian [5] are determined by periodicity in the angle $\theta$:

$$\Psi_{R,L}(\theta,t) = \exp(-iE_n^{R,L}t + in\theta)\psi_{R,L}, \quad [6]$$

where $\psi_{R,L}$ are the eigenstates of $\sigma_z$:

$$\sigma_z\psi_{R,L} = \pm\psi_{R,L} \quad [7]$$

with +(−) corresponding to right (left)-handed fermions.

Equation [7] above does not imply that the right- and left-handed fermions have their spins polarized in a direction orthogonal to the plane of the ring. Indeed, there is no spin in one spatial dimension, and since in this case $\gamma_5 = \sigma_z$, the eigenstates of $\sigma_z$ simply correspond to clockwise (R) and counter-clockwise (L) rotating fermions.

Substituting equation [6] into equation [5] yields the following eigenvalues $$E_n^{R,L} = \pm\hbar\omega\left(n + \frac{\Phi}{\Phi_0}\right); n \in \mathbb{Z}, \quad [8]$$

corresponding to the positive energy particles and negative energy "antiparticles;" the sign of the energy is fixed by chirality.

Some defining features of the chirality anomaly are present in equation [8] and include the following:
- There is an infinite tower of eigenstates with energies extending down to $E \to -\infty$—this is the "Dirac sea" of relativistic quantum field theory;
- The energies of all states in this infinite tower respond to an external magnetic flux, so it is impossible to describe the Dirac sea response by introducing an ultraviolet cutoff;
- Right- and left-handed fermions respond differently to an external magnetic flux—the energies of the right-handed fermions increase with magnetic flux $\Phi$, whereas the energies of the left-handed fermions decrease. As a result, an external magnetic flux generates a collective current in the Dirac sea.

The external flux $\Phi$ in general breaks the degeneracy between the energies of the right- and left-handed fermions. However, if $\Phi/\Phi_0$ is an integer or a half-integer, due to the symmetry under time reversal, the energy spectra of the right- and left-handed fermions are the same, and so each energy level is doubly degenerate due to the presence of both right- and left-handed fermions, in accord with Kramers theorem.

Nevertheless, looking not at the entire spectrum but at a specific energy level, its energy does change when $\Phi/\Phi_0$ changes, even if this is a change by an integer number. As a result, as follows from equation [4], a time-dependent magnetic flux through the ring $\Phi = \oint A_1 dx = R \oint A_\theta d\theta$ results in the change in the difference between the occupation numbers of right- and left-handed fermions.

Each of the states within the spectrum given by equation [8] corresponds to a circulating charged fermion, and thus supports a corresponding quantum "persistent" current given by $$J_n^{R,L} = -\frac{\partial E_n^{R,L}}{\partial \Phi} = \mp e \frac{\hbar \omega}{2\pi}, \quad [9]$$

where the upper(lower) sign corresponds to the right-(left-) handed fermion. Since the current [9] is the same or all quantum states n, the total current must be evaluated as the sum over all occupied quantum states.

To compute the resulting spatial component J of the electric (vector) current $J^\mu = J_R^\mu + J_L^\mu$, the sum over all occupied states of left- and right-handed fermions is performed as follows:

$$J = J_R + J_L = e \frac{\hbar \omega}{2\pi} \left( \sum_{n=-\infty}^{N_L} 1 - \sum_{m=-\infty}^{N_R} 1 \right), \quad [10]$$

where $N_L(N_R)$ is the maximal value of the quantum number n for the occupied left (right)-handed fermions, and 1 is the occupation number for the n-th fermion mode. The individual terms in equation [10] diverge; however, their difference is finite. The Fermi energies of left- and right-handed fermions are given by $E_F^L = E_n^L(n=N_L)$ and $E_F^R = E_n^R(n=N_R)$; introducing the chiral chemical potential $\mu_5 = (E_F^R - E_F^L)/2$, equation [10] can be rewritten as $$j = -e \frac{\mu_5}{\pi}. \quad [11]$$

This is the formula for the chiral magnetic current in (1+1) dimensions.

In (3+1) dimensions, the chiral magnetic effect requires an external magnetic field $\vec{B}$; in this case the current [11] flows in the direction of $\vec{B}$. To obtain the current density in (3+1) dimensions, [11] must be multiplied by the density of fermion states in a plane transverse to $\vec{B}$ given by $eB/(2\pi)$; this yields $$\vec{J} = -\frac{e^2 \mu_5}{2\pi^2} \vec{B}. \quad [12]$$

At finite temperature, to evaluate the current one needs to differentiate not the energy but the thermodynamic potential; however the results for the current in equations [11] and [12] do not change and are independent of temperature; this is a consequence of the chiral anomaly that relates the chirality of fermion modes to the topology of the gauge field. This means that the CME is robust with respect to all perturbations that do not flip the chirality of fermions.

Figures 6A, 6B, 6C:
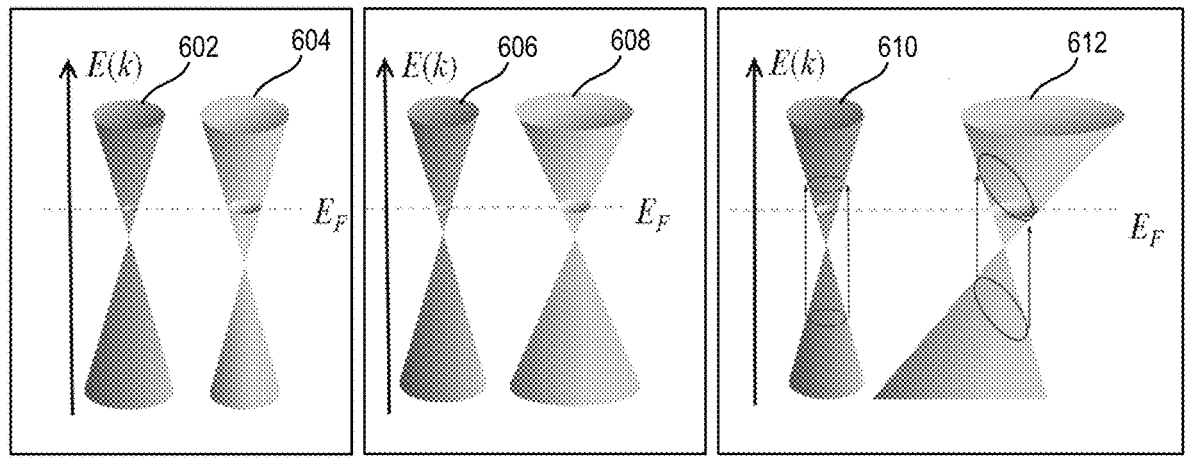
FIGS. 6A-6C conceptually illustrate multiple kinds of asymmetric Weyl semimetals using Weyl or Dirac 3D cones, with FIG. 6A showing Weyl notes at different energy levels, FIG. 6B showing different Fermi velocities for the left- and right-Weyl fermions, and FIG. 6C showing left-symmetric and right-tilted Weyl cones.

In one or more alternative embodiments, asymmetric Weyl semimetals (in which the dispersions of left- and right-handed fermions are different) are used to form the chiral qubit. In this embodiment, unpolarized radiation induces transitions between the basis states of the chiral qubit and creates the quantum superpositions of these states. FIGS. 6A-6C conceptually illustrate multiple kinds of asymmetric Weyl semimetals using 3D cones. FIG. 6A depicts left- and right-handed Weyl fermions, 602 and 604, respectively, having Weyl nodes at different energy levels. FIG. 6B depicts different Fermi velocities for the left- and right-handed Weyl fermions, 606 and 608, respectively. FIG. 6C depicts left-handed symmetric and right-handed tilted Weyl cones, 610 and 612, respectively. The qubit setup based on an asymmetric Weyl semimetal can also utilize the "chiral magnetic superconductivity," when fermions of one chirality are gapped while fermions of the other chirality are not.

The energy difference between discrete states in the chiral qubit of approximately 100 nm in size is about 10 meV. This allows the use of THz (far IR) frequency laser radiation and quantum computation with a frequency of up to 1 THz, which is about two orders of magnitude higher than the current conventional processor clock frequency.

Chiral vortical effect (CVE) is the appearance of an axial current in a system of rotating relativistic fermions. CVE can also exist in Dirac/Weyl semimetals, in which quasiparticles near Dirac/Weyl notes behave like relativistic fermions with definitive chirality. In condensed matters, CVE may be realized in a closed loop made of Weyl semimetals with tilting Weyl cones, such as TaAs, under incident circular polarized light (CPL) via a circular photogalvanic effect (CPGE). The CPGE induces a rotating chiral current $I_{CC}$ in Weyl semimetals, giving rise to a measurable voltage perpendicular to the current plane that can be directly measured by conventional methods with an electrical conductive layer and a grounding plate, among other means. As such, a novel chiral qubit can be constructed based on the CPGE and CVE in Weyl semimetals.

In TaAs, the chirality of the Weyl fermions can be directly detected by measuring the photocurrent $I_{CC}$ in response to circularly polarized mid-infrared light. The resulting photocurrent is determined by both the chirality of Weyl fermions and that of the photons. As will be described in conjunction with FIGS. 7A and 7B, the principle of the CPGE is given below for optical transitions of Weyl fermions.

Figure 7A:
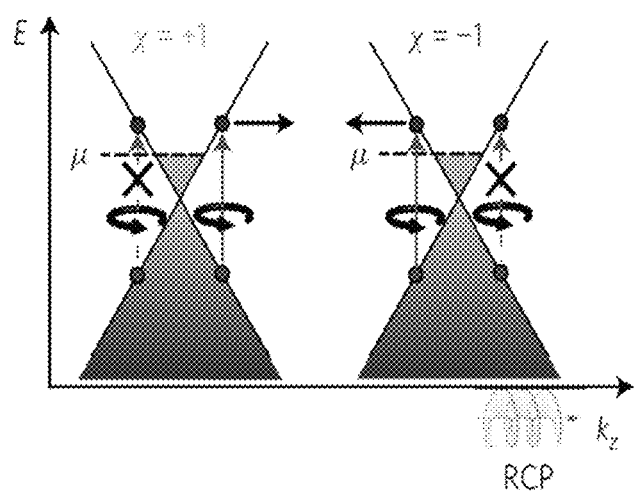
FIGS. 7A and 7B conceptually depict the chirality-dependent optical transition of Weyl fermions with symmetric and titled cones, respectively.
Figure 7B:
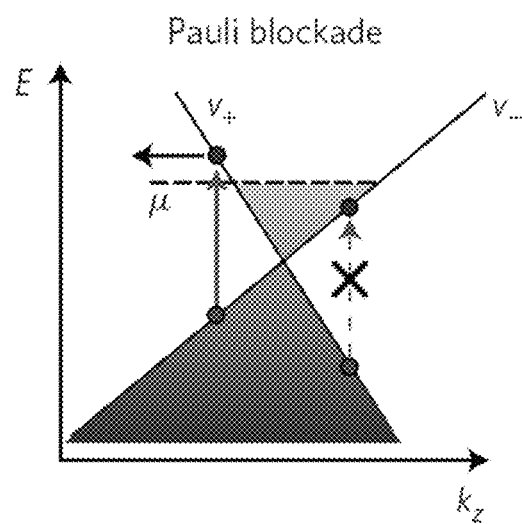

FIGS. 7A and 7B conceptually depict the chirality-dependent optical transition of Weyl fermions with symmetric and titled cones, respectively. With reference to FIG. 7A, the chirality selection rule dictates that for a right circularly polarized (RCP) light propagating along $+\hat{z}$ and a right-handed Weyl fermion ($\chi = +1$), the optical transition is allowed on the $+k_z$ side, but forbidden on the $-k_z$ side due to the conservation of angular momentum. As shown in FIG. 7B, a Pauli blockade is present when the chemical potential is away from the Weyl node, and becomes asymmetric about the nodal point in the presence of a finite tilt Weyl cone. For semimetals with symmetric Weyl notes, the total photocurrent is zero because contributions from different Weyl fermions will cancel each other, although there is nonzero current associated with a single Weyl cone. In an inversion-breaking Weyl semimetal, like TaAs, with mirror symmetries, the total current becomes non-vanishing.

As previously stated, when chiral fermions are set into rotational motion, a CVE current is generated. The net current $J_{CVE}$ depends on the chiral chemical potential $\mu_5$, and is given by $$j_{CVE} \sim e \frac{\mu}{\hbar v_F} \cdot \frac{\mu_5}{\hbar v_F} \cdot \Omega \quad [13]$$

after restoring dimensionful parameters, where $\mu$, $\mu_5$ are the ordinary and chiral chemical potentials, respectively, $\Omega$ is the angular velocity, $v_F$ is the Fermi velocity and e, $\hbar$ are the usual constants. Angular velocity $\Omega$ can be expressed as $$\Omega = \frac{v_{drift}}{R},$$

where $v_{drift}$ is the drift velocity due to the primary current and R is the radius of curvature of the corner.

Figure 8:
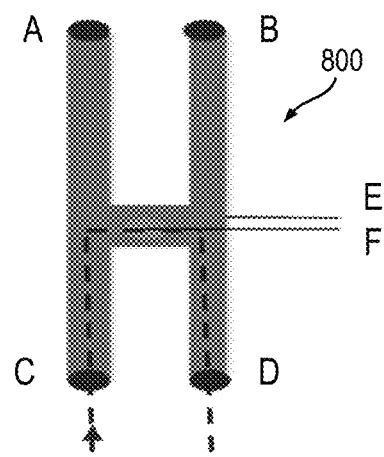
FIG. 8 illustrates at least a portion of an exemplary device adapted to measure the chiral vertical effect (CVE) in Weyl semimetals, such as TaAs, according to an embodiment of the present invention.

By way of illustration only, FIG. 8 depicts at least a portion of an exemplary device 800 adapted to measure the CVE in Weyl semimetals, such as TaAs, according to an embodiment of the invention. In this exemplary geometry, injecting chiral current from terminal pairs (e.g., terminals C and D in FIG. 8) leads to a voltage between terminals E and F. Using $\mu$, $\mu_5 \sim 10$ meV, $v_F \sim 10^5$ m/s and R $\sim 1$ mm, yields $j_{CVE} \sim v_{drift}$ in SI units. Ordinary metals have a drift velocity $v_{drift} \sim 10^4$ m/s, while graphene has been found to have a drift velocity $v_{drift}$ as large as $v_F$. Weyl semimetals are similar to graphene, so using $v_F$ instead of $v_{drift}$ gives $j_{CVE} \sim 10^5$ A/m². To convert this current into a voltage, the reported conductivity of TaAs is used, $\sigma \sim 10^6 / \Omega$m, which gives the electric field between terminals E and F in the exemplary device shown in FIG. 8 as $$E_{EF} = \frac{j_{CVE}}{\sigma} = 0.1 \text{ V/m.}$$

Assuming the device has a thickness of 1 mm, then $V_{EF} \sim 10^4$ volt (V).

Figure 9A:
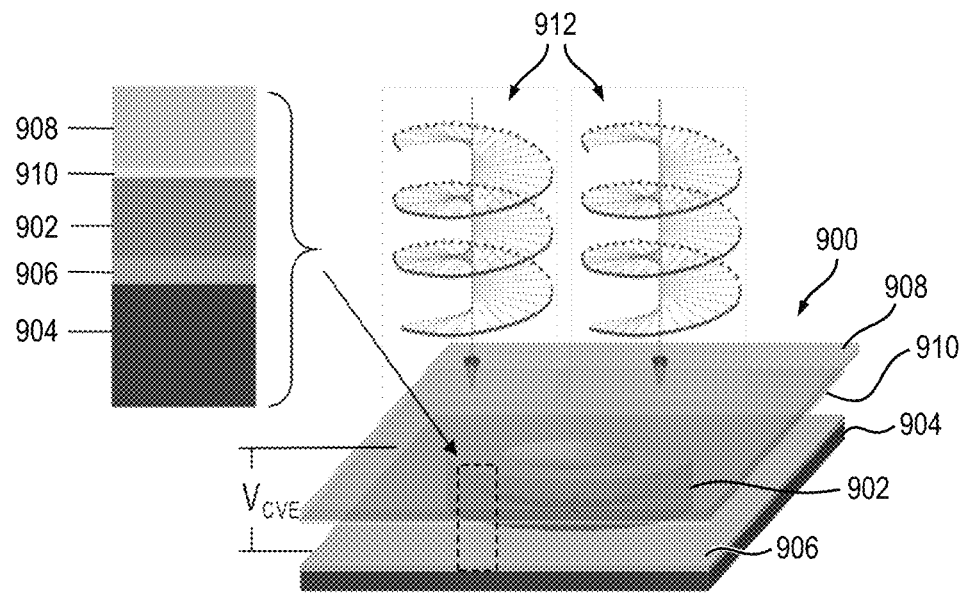
FIGS. 9A and 9B conceptually depict at least a portion of apparatus configured for CVE voltage detection, according to embodiments of the present invention.
Figure 9B:
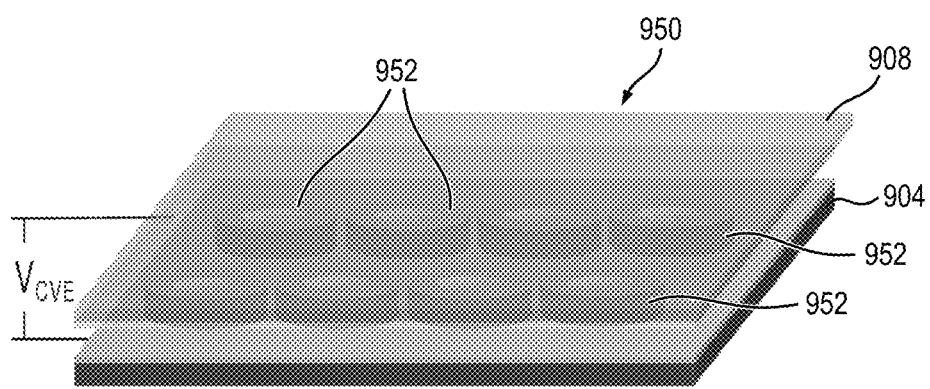

FIGS. 9A and 9B conceptually depict at least a portion of apparatus configured for CVE voltage detection, according to embodiments of the invention. With reference to FIG. 9A, a CVE voltage detection apparatus 900 includes a semimetal ring 902, which may comprise a Weyl or Dirac semimetal, formed on an upper surface of a first conducting layer 904, which in one or more embodiments may be a ground plate. A first thin (e.g., about 1 μm in thickness) insulating layer 906 may optionally be disposed between the ground plate 904 and the semimetal ring 902 for electrically isolating the ring from the ground plate. A second conducting layer 906 is preferably disposed on an upper surface of the semimetal ring 902. Optionally, a second thin (e.g., about 1 μm in thickness) insulating layer 908 is disposed between the semimetal ring 902 and the second conducting layer 906 for electrically isolating the ring from the second conducting layer.

A circulating chiral current, either left-handed or right-handed, will be generated in the closed loop ring 902 comprising Weyl semimetals with tilting Weyl cones as a result of incident circular polarized light (CPL) 912 via CPGE. This apparatus 900 can be used, in one or more embodiments, to explore the CVE through measurement of voltage $V_{CVE}$ perpendicular to the plane of circulating chiral current. The voltage $V_{CVE}$ is measured across the first and second conducting layers 904, 908. This voltage is produced due to CPL. Care should be taken to substrate the contribution of possible thermal voltage due to the heating effect by the incident light. The heating produces a temperature gradient leading to a thermal voltage between the first and second conducting layers that can be discerned by the fact that the thermal voltage does not depend on the polarization.

FIG. 9B illustrates at least a portion of an exemplary apparatus 950 which comprises a plurality of semimetal rings 952 arranged in an array, according to an alternative embodiment of the invention. The apparatus 950, in one or more embodiments, comprises a 10×10 array of a micrometer sized TaAs ring, which appears to be practical as its overall size is preferably within the CPL spot size generated by a typical $CO_2$ laser. It is to be understood, however, that embodiments of the invention are not limited to any particular dimensions or number of semimetal rings in the array. CVE can be explored using this arrangement 950, which essentially works in a manner consistent with the apparatus 900 shown in FIG. 9A. Using an array of semimetal rings 952 increases the voltage $V_{CVE}$ formed across the first and second conducting layers 904, 908.

Figures 10A, 10B, 10C, 10D:
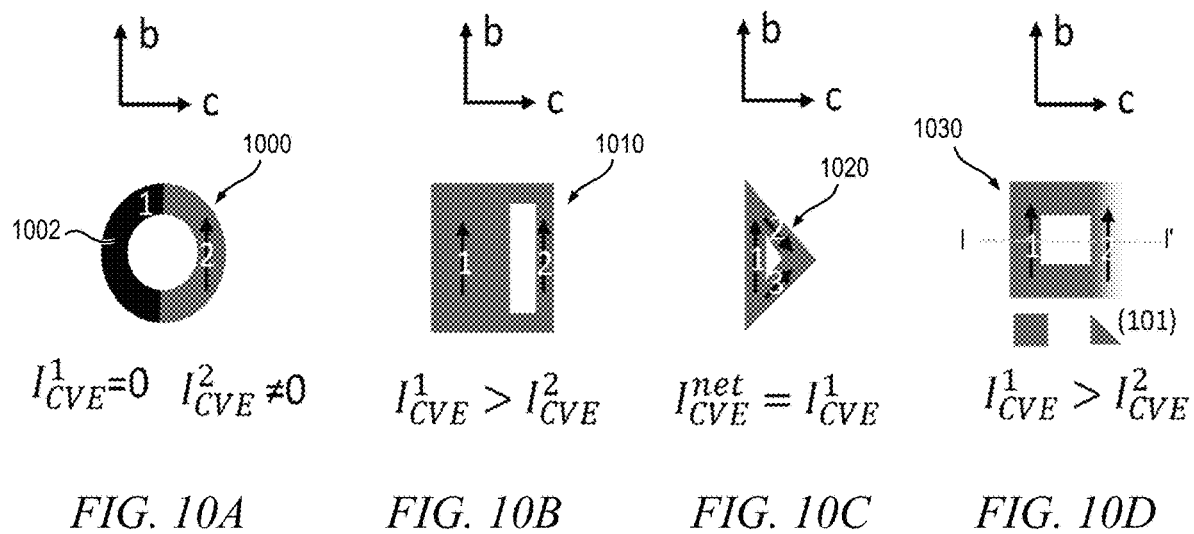
FIGS. 10A-10D are top level views depicting exemplary modifications of Weyl semimetal ring structures, according to embodiments of the present invention.

FIGS. 10A-10D are top level views depicting exemplary modifications of Weyl semimetal ring structures, according to embodiments of the invention. It is to be appreciated that embodiments of the invention are not restricted to any specific shape or dimensions of the ring structure. Rather, the ring can be any shaped loop. A symmetric ring produces no net chiral current. Thus, for the circular ring 1002 shown in FIG. 10A, one way to effectively produce an asymmetric structure is to cover a portion of the ring (e.g., half) with a material or coating 1004 that is opaque to IR; region 1 is opaque to IR and region 2 is uncovered. FIG. 10B shows a rectangular ring 1010 with asymmetric exposed areas, region 1 being larger in area compared to region 2. FIG. 10C depicts a triangular ring 1020 having one side (1) parallel to the b-axis. FIG. 10D depicts a rectangular ring 1030 having one exposed surface (side 1) perpendicular to incident light, while the another exposed surface (side 2) is angled (e.g., 45 degrees) relative to the incident light; a cross-sectional view of the ring 1030 taken along line 1-1' is shown below the top level view.

By way of example only and without limitation, one or more embodiments of the invention provide a chiral qubit apparatus and quantum computing method capable of operating at room temperature. The apparatus and method according to one or more embodiments of the invention utilize the CME discovered experimentally in a Dirac semimetal $ZrTe_5$. The novel chiral qubit is based on the ability of direct optical control of Weyl fermion chirality, and the non-dissipative transport of chiral fermions in the case of conserved chirality. The apparatus and method according to one or more embodiments of the invention utilize a micrometer-sized loop structure comprising a Dirac or Weyl semimetal (DSM or WSM, respectively). At micrometer scales, the electric current of chiral fermions (that is responsible for the CME) may dissipate slowly. Under the limit of fast switching in the range of THz, the loop supports a persistent current, and operates similarly to the superconducting flux qubit, but advantageously without the need to cool the qubit down to about 10 mK.

Figure 11:
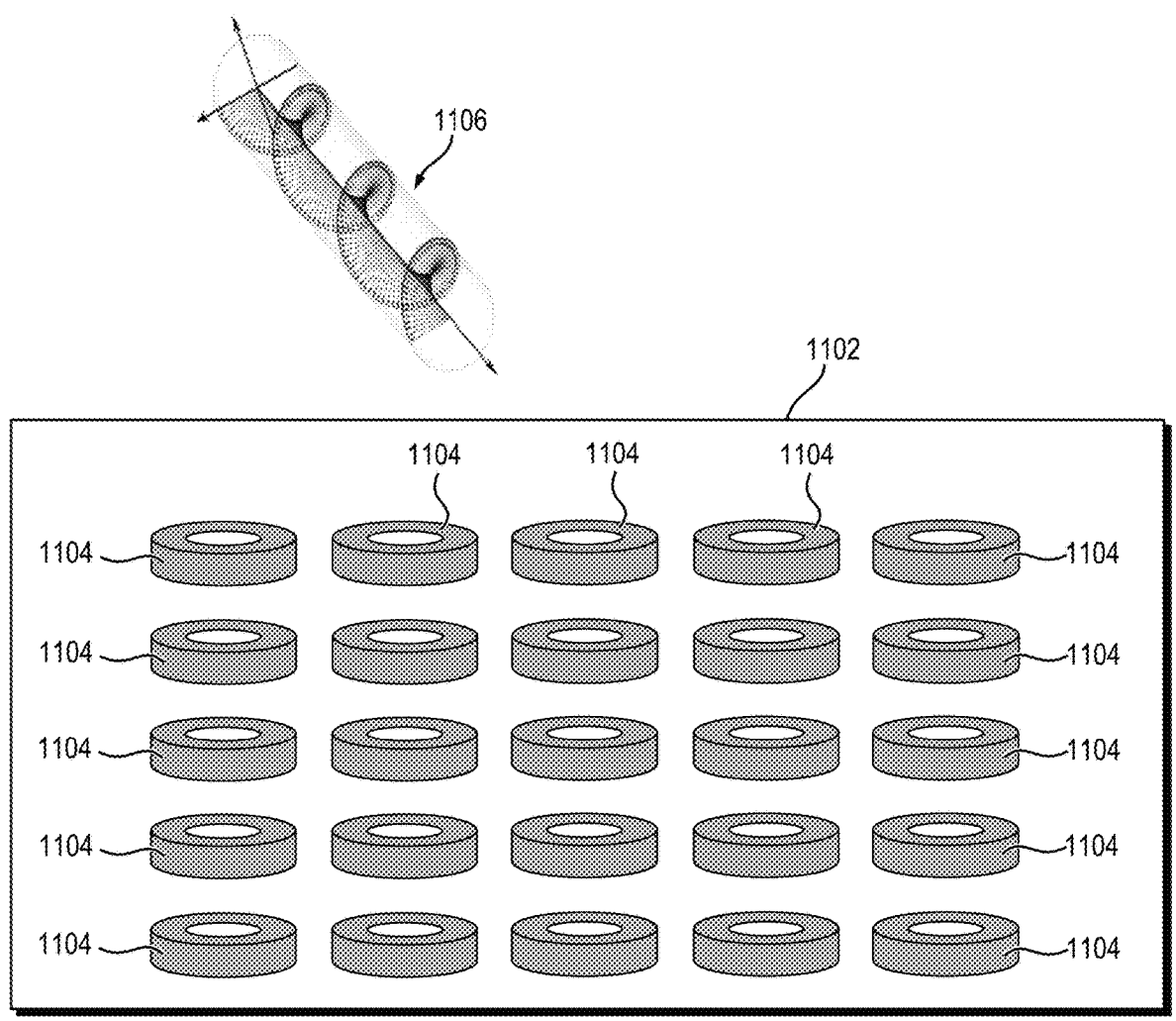
FIG. 11 depicts at least a portion of an exemplary chiral quantum processor including an array of chiral qubits, according to an embodiment of the present invention.

In certain embodiments, multiple chiral qubits are arranged to form a chiral quantum processor. FIG. 11 depicts at least a portion of an exemplary chiral quantum processor 1102 suitable for use in a quantum computing system, formed in accordance with an embodiment of the invention.

The chiral quantum processor 1102 includes a plurality of chiral qubits 1104 arranged in an array. Readout devices and related circuitry are not shown for clarity purposes. Each of at least a subset of the chiral qubits 1104 is preferably implemented as a micrometer-sized loop structure comprising a Dirac or Weyl semimetal, such as, for example, $ZrTe_5$. It is to be appreciated, however, that embodiments of the present invention are not limited to any specific number and/or arrangement of chiral qubits 1104 in the quantum processor 1102, nor are the embodiments limited to any specific type, shape and/or dimensions of the material forming the qubits. In this embodiment, a source of circularly polarized light 1106 shining on a subset of the chiral qubits 1104 creates an entangled quantum state of these qubits that is used for quantum information processing.

Further details and an operation of the chiral quantum processor 1102 will now be described, with reference to FIG. 11. In one or more embodiments of the invention, an implementation of chiral quantum computation includes nanofabricated chiral electronics elements (e.g., chiral qubits 1104) coupled with circularly polarized light (e.g., CPL source 1106). In quantum computing, chiral loops (which may be called persistent current loops at high frequency $\omega$ limit $$\omega \gg \frac{1}{\tau_v},$$

where $\tau_v$ is the chirality flipping time) are micrometer or sub-micrometer sized loops of chiral materials, such as a Dirac or Weyl semimetal, with sections engineered into inductive coils so that a persistent current will flow continually, in the limit of conserved chirality.

Figure 12:
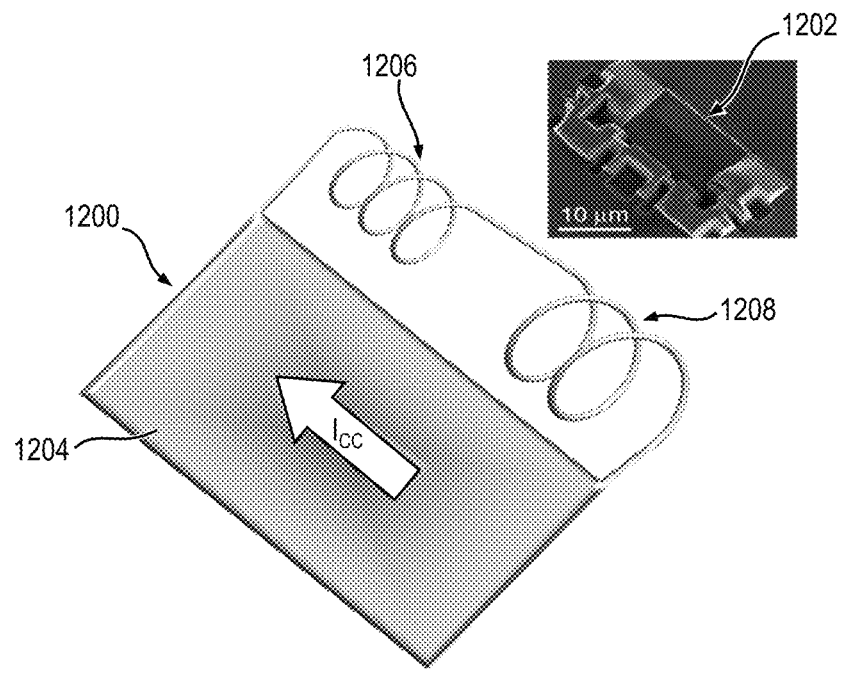
FIG. 12 depicts at least a portion of an exemplary chiral loop device, according to an embodiment of the present invention.

At least a portion of an exemplary chiral loop device (i.e., chiral qubit) 1200 according to one or more embodiments of the invention is shown in FIG. 12, the inset to which shows a nano-fabricated chiral element 1202. This specific chiral element 1202 was fabricated with a Dirac semimetal, $ZrTe_5$, using, for example, focused ion beams. The nano-fabricated chiral element 1202 shown in FIG. 12 demonstrates that various shapes of loop with different arrangements of contact leads can be made using modern nano-technology.

With continued reference to FIG. 12, the chiral loop device 1200 includes a main body portion 1204 comprising a Dirac or Weyl semimetal, such as $ZrTe_5$, a first inductive coil 1206, which may form a read port in the device, and a second inductive coil 1208, which may form a write port in the device. The main body portion 1204, first inductance coil 1206 and second inductive coil 1208 are electrically connected together in series to form a closed loop. The chiral loop device 1200, in one or more embodiments, is made by nanofabrication on a single piece of Dirac or Weyl semimetal crystal (i.e., the main body portion 1204 and first and second inductive coils 1206, 1208 can be fabricated monolithically on the same substrate), so that a persistent chiral current, $I_{CC}$, flows in the device (indicated by the arrow) produced by incident circularly polarized light. An amplitude of the chiral current $I_{CC}$ produced in the device will be a function of one or more properties of the light source, including, but not limited to, duration, intensity, beam width, and/or frequency. Thus, by modulating one or more properties of the light source, the amplitude of the chiral current in the device can be modulated accordingly.

Figure 13:
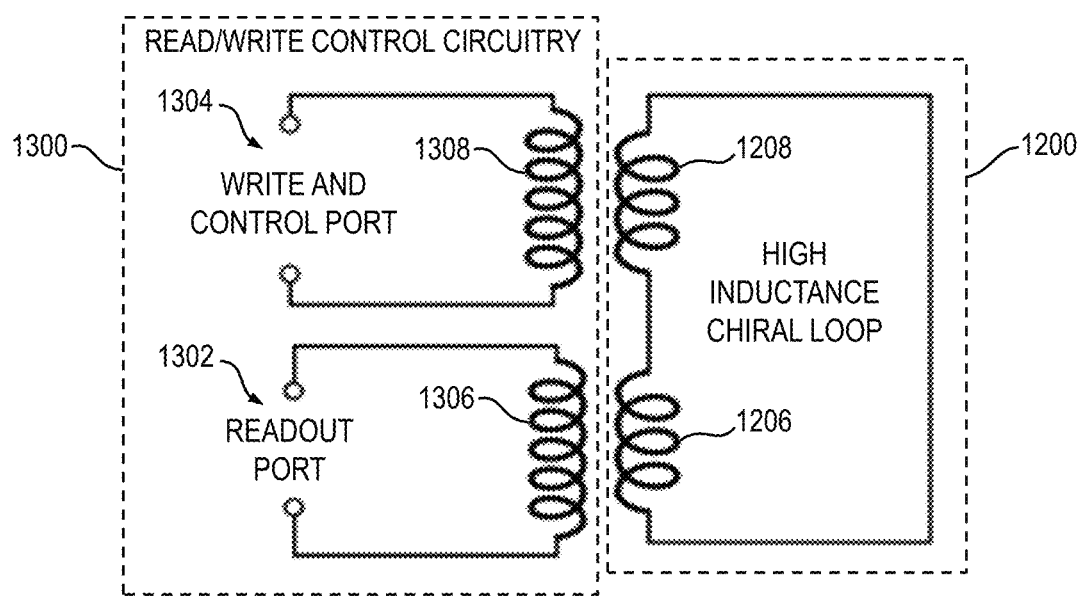
FIG. 13 is a schematic diagram depicting at least a portion of an exemplary quantum computing system including the illustrative chiral qubit shown in FIG. 12, implemented with chiral materials in a high inductance loop, along with corresponding read/write control circuitry, according to an embodiment of the present invention.

As previously explained, computational basis states of a chiral qubit are defined by circulating currents which can flow either clockwise or counter-clockwise. FIG. 13 is a schematic diagram depicting at least a portion of an exemplary quantum computing system including the illustrative chiral qubit 1200 shown in FIG. 12, implemented with chiral materials in a high inductance loop, along with corresponding read/write control circuitry 1300, according to an embodiment of the invention. The quantum state of the chiral qubit 1200, in one or more embodiments, is measured using inductively coupled readout and write ports 1302 and 1304, respectively, for sensing the light-induced current $I_{CC}$ circulating in the chiral qubit 1200. Multiple chiral loops (or arrays of chiral loops) can be connected together in parallel via read/write ports, or processed like an integrated circuit, to increase total current output. For simplicity, a single read/write control circuit is shown in FIG. 13, although it is to be understood that multiple read/write control circuits may be similarly employed.

The read/write control circuitry 1300, in this embodiment, comprises a first coil 1306 that is inductively coupled with the read port 1206 in the chiral qubit 1200, and a second coil 1308 that is inductively coupled with the write port 1208 in the chiral qubit. The chiral current indicative of the basis quantum state in which the chiral qubit 1200 resides is sensed (i.e., read) via the first coil 1306 and made externally accessible via the readout port 1302. Similarly, chiral current in the chiral qubit 1200, and thus the basis state of the qubit, can be influenced by introducing a write current to the second coil 1308 via the externally accessible write port 1304. As shown in FIG. 13, the readout port 1302 in the read/write control circuitry 1300 is decoupled, and in certain embodiments completely decoupled, from the qubit in the OFF phase. Isolation of the chiral qubit 1200 both from the readout port 1302 and the control port 1304 is achieved through impedance mismatch of transformers.

Computation operations are performed, in one or more embodiments of the invention, by pulsing the chiral qubit 1200 with THz (e.g., far IR) radiation which has an energy comparable to that of a gap between the energy of the two basis states. Properly selected frequencies are configured to place the chiral qubit into quantum superposition of the two basis states. Subsequent light pulses can manipulate the probability weighting that the chiral qubit will be measured in either of the two basis states, plus performing a computational operation.

As explained in conjunction with FIG. 5, in one or more embodiments, when a chiral qubit is irradiated with a circularly polarized light or other radiation source (e.g., far infrared), a current will be excited in the qubit. This current will cause an electromagnetic field to be emitted by the qubit. In a quantum computing application, where multiple chiral qubits are employed, the electromagnetic field emitted by one qubit will be absorbed by, or otherwise influence, one or more adjacent qubits, and so these qubits will become entangled. As is known by those skilled in the art, quantum entanglement is a physical phenomenon that occurs when pairs or groups of particles are generated, interact, or share spatial proximity in ways such that the quantum state of each particle cannot be described independently of the state of the others, even when the particles are separated by a large distance. In one or more embodiments, a THz cavity, such as, for example, a split-ring resonator or the like, is coupled with the plurality of chiral qubits to detect the quantum states of the qubits as part of an overall quantum computing apparatus or system.

Existing realizations of superconducting qubits require low temperatures, typically below 100 mK. This makes it necessary to undesirably employ sophisticated refrigeration systems; as a result, the current quantum computers are very expensive (e.g., about $10M) and large. Advantageously, a chiral qubit system and method according to one or more embodiments of the invention is capable of operation at room temperature. This is due, at least in part, to a reliance of the system and method on exploiting approximate conservation of chirality in Weyl and Dirac semimetals at sub-micron scales, which holds at room temperatures. A room temperature chiral qubit beneficially enables a revolution in quantum computer technology by dramatically reducing the cost and size of the quantum processor, and making it possible to commercially implement consumer quantum computer devices.

Given the discussion thus far, it will be appreciated that an exemplary apparatus for performing quantum computing includes multiple qubits, each of at least a subset of the qubits comprising a loop formed of a Dirac or Weyl semimetal and having at least two stable quantum states. The apparatus further includes at least one terahertz cavity coupled with the qubits, the terahertz cavity being configured to detect the quantum states of the qubits. Each of at least the subset of qubits is configured to receive a circularly polarized radiation source. The radiation source is adapted to excite a chiral current in each of at least the subset of qubits, the quantum states of the plurality of qubits being a function of the chiral current.

Given the discussion thus far, it will also be appreciated that an exemplary method for performing quantum computing includes: providing a plurality of qubits, each of at least a subset of the qubits comprising a loop formed of a Dirac or Weyl semimetal and having at least two stable quantum states, and at least one terahertz cavity coupled with the plurality of qubits, the terahertz cavity being configured to detect the quantum states of the qubits; and exposing at least the subset of qubits to a circularly polarized radiation source, whereby a chiral current is excited in each of at least the subset of qubits, the quantum states of the plurality of qubits being a function of the chiral current.

At least a portion of the techniques of the present invention may be implemented in an integrated circuit. In forming integrated circuits, identical die are typically fabricated in a repeated pattern on a surface of a semiconductor wafer. Each die includes a device described herein, and may include other structures and/or circuits. The individual die are cut or diced from the wafer, then packaged as an integrated circuit. One skilled in the art would know how to dice wafers and package die to produce integrated circuits. Any of the exemplary circuits illustrated in the accompanying figures, or portions thereof, may be part of an integrated circuit. Integrated circuits so manufactured are considered part of this invention.

Those skilled in the art will appreciate that the exemplary structures discussed above can be distributed in raw form (i.e., a single wafer having multiple unpackaged chips), as bare dies, in packaged form, or incorporated as parts of intermediate products or end products used in a quantum computing application in accordance with one or more embodiments of the invention.

An integrated circuit in accordance with aspects of the present disclosure can be employed in essentially any application and/or electronic system where quantum computers are employed. Suitable systems and devices for implementing embodiments of the invention may include, but are not limited to, quantum computing systems, quantum memory, quantum sensors, storage devices, etc. Systems incorporating such integrated circuits are considered part of this invention. Given the teachings of the present disclosure provided herein, one of ordinary skill in the art will be able to contemplate other implementations and applications of embodiments of the invention.

The illustrations of embodiments of the invention described herein are intended to provide a general understanding of the various embodiments, and they are not intended to serve as a complete description of all the elements and features of apparatus and systems that might make use of the circuits and techniques described herein. Many other embodiments will become apparent to those skilled in the art given the teachings herein; other embodiments are utilized and derived therefrom, such that structural and logical substitutions and changes can be made without departing from the scope of this disclosure. The drawings are also merely representational and are not drawn to scale. Accordingly, the specification and drawings are to be regarded in an illustrative rather than a restrictive sense.

Embodiments of the invention are referred to herein, individually and/or collectively, by the term "embodiment" merely for convenience and without intending to limit the scope of this application to any single embodiment or inventive concept if more than one is, in fact, shown. Thus, although specific embodiments have been illustrated and described herein, it should be understood that an arrangement achieving the same purpose can be substituted for the specific embodiment(s) shown; that is, this disclosure is intended to cover any and all adaptations or variations of various embodiments. Combinations of the above embodiments, and other embodiments not specifically described herein, will become apparent to those of skill in the art given the teachings herein.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Terms such as "upper," "lower" and "back" are used to indicate relative positioning of elements or structures to each other when such elements are oriented in a particular manner, as opposed to defining absolute positioning of the elements.

The corresponding structures, materials, acts, and equivalents of all means or step-plus-function elements in the claims below are intended to include any structure, material, or act for performing the function in combination with other claimed elements as specifically claimed. The description of the various embodiments has been presented for purposes of illustration and description, but is not intended to be exhaustive or limited to the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the various embodiments with various modifications as are suited to the particular use contemplated.

The abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, inventive subject matter lies in less than all features of a single embodiment. Thus the following claims are hereby incorporated into the Detailed Description, with each claim standing on its own as separately claimed subject matter.

Given the teachings of embodiments of the invention provided herein, one of ordinary skill in the art will be able to contemplate other implementations and applications of the techniques of embodiments of the invention. Although illustrative embodiments of the invention have been described herein with reference to the accompanying drawings, it is to be understood that embodiments of the invention are not limited to those precise embodiments, and that various other changes and modifications are made therein by one skilled in the art without departing from the scope of the appended claims.

What is claimed is:

1. An apparatus for performing quantum computing, the apparatus comprising:
   a plurality of qubits, each of at least a subset of the plurality of qubits comprising a loop formed of a Dirac or Weyl semimetal and having at least two stable quantum states; and
   at least one terahertz cavity coupled with the plurality of qubits, the terahertz cavity being configured to detect the quantum states of the qubits;
   wherein each of at least the subset of qubits is configured to receive a circularly polarized radiation source, the radiation source being adapted to excite a chiral current in each of at least the subset of qubits, the quantum states of the plurality of qubits being a function of the chiral current.

2. The apparatus of claim 1, wherein each of at least the subset of qubits comprises a ring of Dirac or Weyl semimetal having a diameter of about one micron or less.

3. The apparatus of claim 1, wherein the Dirac or Weyl semimetal comprises at least one of zirconium pentatelluride ($ZrTe_5$), tantalum arsenide (TaAs), cadmium arsenide ($Cd_3As_2$), trisodium bismuthide ($Na_3Bi$), niobium arsenide (NbAs), niobium phosphide (NbP), and tantalum phosphide (TaP).

4. The apparatus of claim 1, wherein an amplitude of the chiral current excited in each of at least the subset of qubits is a function of at least one of a frequency, intensity, duration and beam width of the circularly polarized radiation source.

5. The apparatus of claim 4, wherein the frequency of the circularly polarized radiation source is in a far infrared spectrum.

6. The apparatus of claim 1, wherein the terahertz cavity coupled with the plurality of qubits comprises a split ring resonator.

7. The apparatus of claim 1, further comprising:
   a first conductive layer, the plurality of qubits being disposed on at least a portion of an upper surface of the first conductive layer; and
   a second conductive layer disposed on an upper surface of each of the plurality of qubits;
   wherein a voltage indicative of chiral vortical effect is developed across the first and second conductive layers.

8. The apparatus of claim 7, further comprising a first insulating layer disposed between the first conductive layer and the plurality of qubits, the first insulating layer electrically isolating the first conductive layer from the plurality of qubits.

9. The apparatus of claim 7, further comprising a second insulating layer disposed between the upper surface of the plurality of qubits and the second conductive layer, the second insulating layer electrically isolating the second conductive layer from the plurality of qubits.

10. The apparatus of claim 7, wherein the voltage indicative of chiral vortical effect is perpendicular to a plane of circulating chiral current in the plurality of qubits.

11. The apparatus of claim 1, wherein the plurality of qubits are arranged in an array, with the qubits spaced in relative proximity to one another such that an electromagnetic field emitted by one qubit will influence one or more adjacent qubits so that the qubits will become entangled.

12. The apparatus of claim 1, wherein each of at least a subset of the plurality of qubits comprises a main body portion comprising the Dirac or Weyl semimetal and first and second inductance coils, the main body portion and first and second inductive coils being electrically connected together in series to form a closed loop.

13. The apparatus of claim 12, wherein the first inductive coil forms a read port of the apparatus and the second inductive coil forms a write port of the apparatus.

14. The apparatus of claim 12, wherein the main body portion and the first and second inductive coils are fabricated monolithically on a same substrate.

15. The apparatus of claim 1, wherein a frequency of the circularly polarized radiation source is configured such that a ratio of coherence time to gate time of each of at least the subset of qubits is at least about 10,000.

16. A method for performing quantum computing, the method comprising:
   providing a plurality of qubits, each of at least a subset of the plurality of qubits comprising a loop formed of a Dirac or Weyl semimetal and having at least two stable quantum states, and at least one terahertz cavity coupled with the plurality of qubits, the terahertz cavity being configured to detect the quantum states of the qubits; and
   exposing at least the subset of qubits to a circularly polarized radiation source whereby a chiral current is excited in each of at least the subset of qubits, the quantum states of the plurality of qubits being a function of the chiral current.

17. The method of claim 16, further comprising modulating the chiral current in each of at least the subset of qubits by controlling at least one of a frequency, intensity, duration and beam width of the circularly polarized radiation source.

18. The method of claim 16, wherein each of at least the subset of the plurality of qubits comprises a main body portion and first and second inductive coils, the method further comprising:
   providing a readout port comprising a third inductive coil disposed proximate to the first inductive coil of a given one of the plurality of qubits; and
   reading the quantum state of the given one of the plurality of qubits by measuring a current in the readout port which is indicative of the chiral current in the given one of the plurality of qubits.

19. The method of claim 18, further comprising:
   providing a write port comprising a fourth inductive coil disposed proximate to the second inductive coil of the given one of the plurality of qubits; and writing the quantum state of the given one of the plurality of qubits by introducing a current in the write port which influences the chiral current in the given one of the plurality of qubits.

20. The method of claim 16, further comprising arranging the plurality of qubits in an array, wherein the qubits are spaced in relative proximity to one another such that an electromagnetic field emitted by one qubit will influence one or more adjacent qubits so that the qubits will become entangled.

* * * * *